(12) United States Patent  
Tame et al.

(10) Patent No.: US 9,308,834 B2  
(45) Date of Patent: Apr. 12, 2016

(54) FULL MEMORY SEAT TRACK MECHANISM

(75) Inventors: Omar D. Tame, West Bloomfield, MI (US); Ameya Gupte, Novi, MI (US); Macit Aktas, Windsor (CA); Jeffrey P. Carroll, West Bloomfield, MI (US)

(73) Assignee: Magna Seating Inc., Aurora, Ontario (CA)

(*) Notice: Subject to any disclaimer, the term of this patent is extended or adjusted under 35 U.S.C. 154(b) by 70 days.

(21) Appl. No.: 13/991,537

(22) PCT Filed: Dec. 5, 2011

(86) PCT No.: PCT/CA2011/001328  
§ 371 (c)(1),  
(2), (4) Date: Jun. 4, 2013

(87) PCT Pub. No.: WO2012/071659  
PCT Pub. Date: Jun. 7, 2012

(65) Prior Publication Data  
US 2013/0278033 A1     Oct. 24, 2013

Related U.S. Application Data

(60) Provisional application No. 61/458,898, filed on Dec. 3, 2010.

(51) Int. Cl.  
*B60N 2/02* (2006.01)  
*B60N 2/07* (2006.01)  
*B60N 2/08* (2006.01)  
*B60N 2/12* (2006.01)

(52) U.S. Cl.  
CPC ............ *B60N 2/0727* (2013.01); *B60N 2/0722* (2013.01); *B60N 2/08* (2013.01); *B60N 2/0818* (2013.01); *B60N 2/123* (2013.01); *B60N 2002/126* (2013.01)

(58) Field of Classification Search  
None  
See application file for complete search history.

(56) References Cited

U.S. PATENT DOCUMENTS

| | | |
|---|---|---|
| 5,137,331 A | 8/1992 | Colozza |
| 5,626,392 A | 5/1997 | Bauer et al. |
| 5,899,532 A | 5/1999 | Paisley et al. |
| 5,944,383 A | 8/1999 | Mathey et al. |
| 6,227,596 B1 | 5/2001 | Foucault et al. |
| 6,231,123 B1 | 5/2001 | Tame |
| 6,439,531 B1 | 8/2002 | Severini et al. |
| 6,513,868 B1 | 2/2003 | Tame |
| 6,767,063 B1 | 7/2004 | Abdekka et al. |
| 7,025,419 B2 | 4/2006 | Sasaki et al. |
| 2012/0019037 A1* | 1/2012 | Rohnert et al. ............ 297/378.1 |

FOREIGN PATENT DOCUMENTS

WO     2010066053     6/2010

* cited by examiner

*Primary Examiner* — David E Allred  
(74) *Attorney, Agent, or Firm* — Miller Canfield

(57) ABSTRACT

A seat track assembly includes a latch mechanism operable to allow movement of a movable track relative to a fixed track between a plurality of positions. A memory mechanism is operable between a home position, coupled with the movable track, and a memory position, coupled with the fixed track, to define a selected position. Actuation of the memory mechanism to the memory position unlocks the latch mechanism to allow movement of the movable track in a first direction away from the selected position to an easy-entry position. In response to movement of the movable track in a second direction from the easy-entry position, the memory mechanism blocks the movable track at the selected position, allowing the latch mechanism to lock and the memory mechanism to return to the home position. The latch mechanism operates independently to unlock the latch mechanism when the memory mechanism is in the home position.

11 Claims, 18 Drawing Sheets

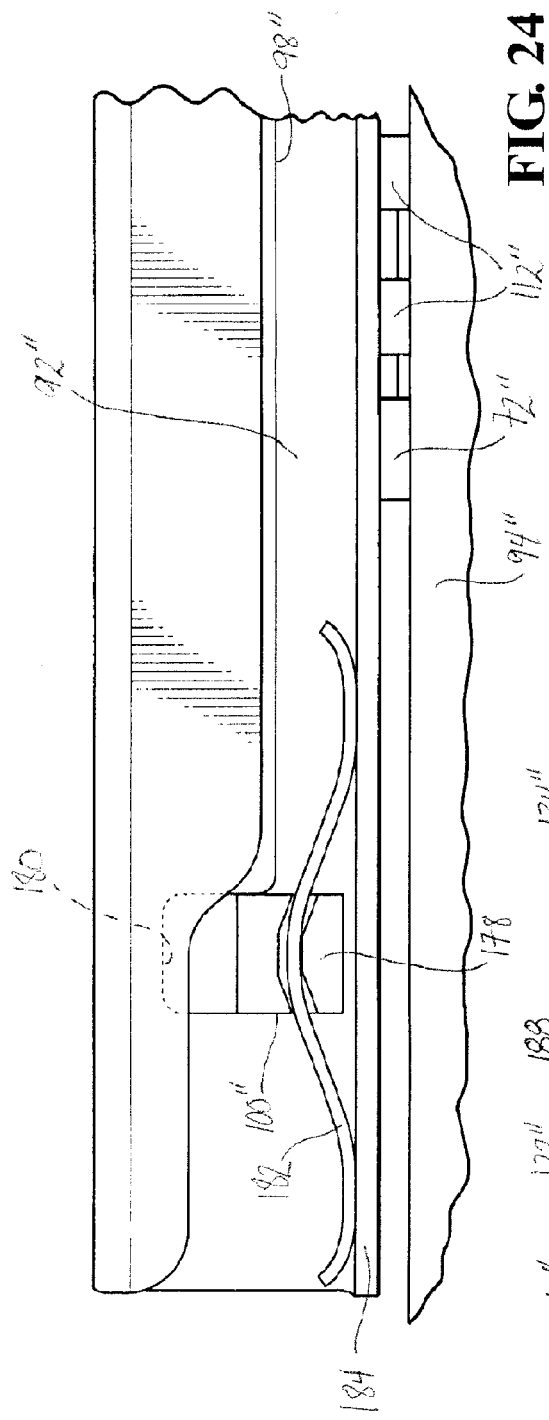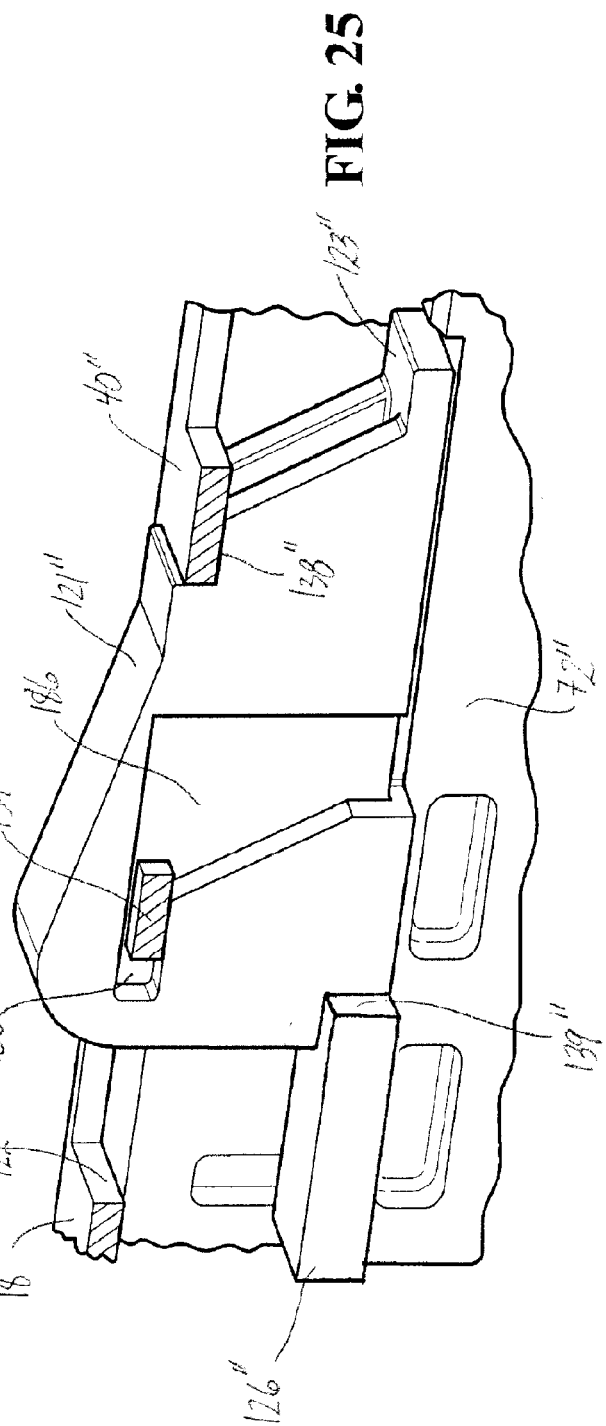

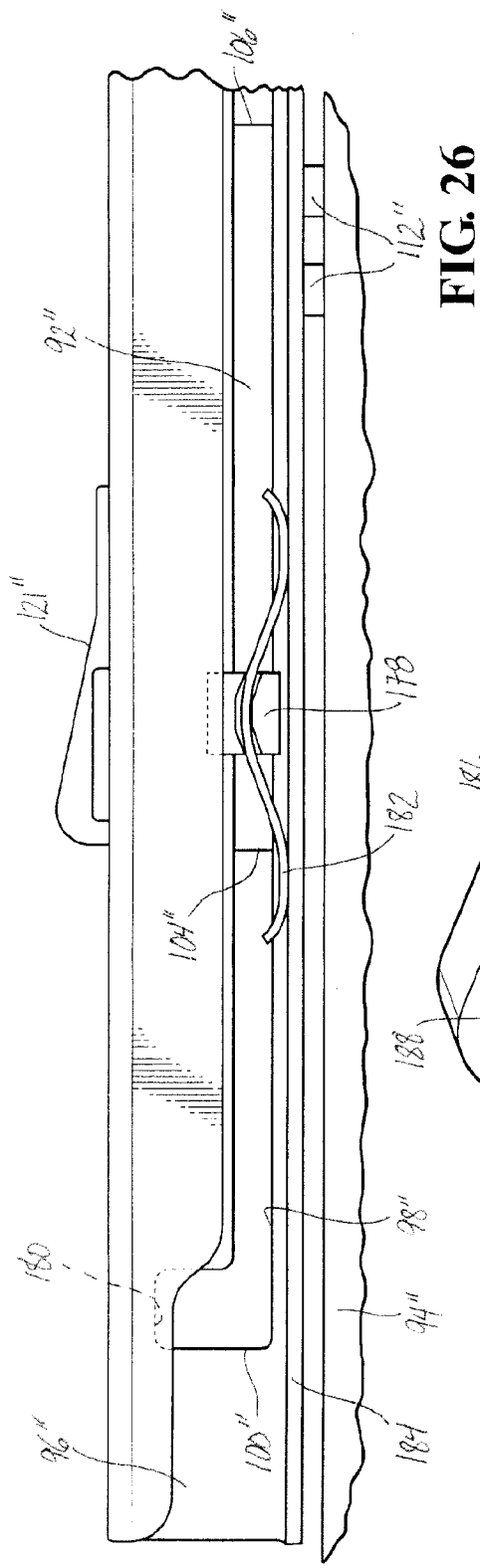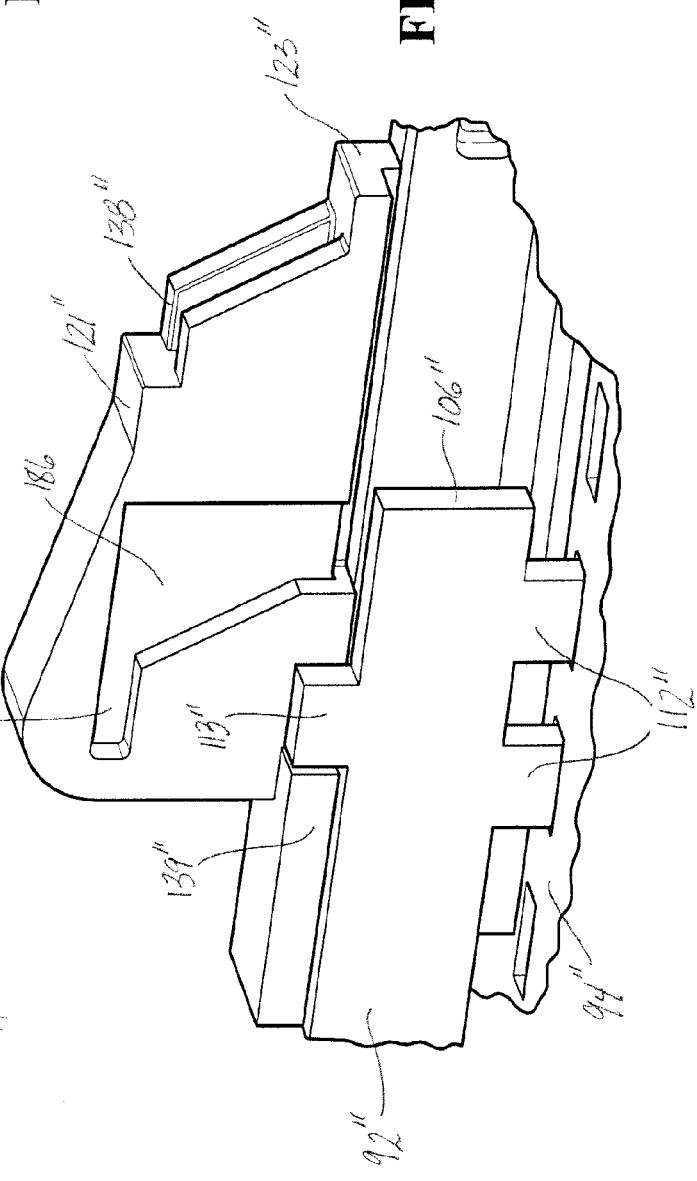

FULL MEMORY SEAT TRACK MECHANISM

CROSS-REFERENCE TO RELATED APPLICATIONS

This application is a national phase application and claims priority to and all the benefits, under 35 USC 371, of PCT/CA2011/001328, filed on Dec. 5, 2011, which in turn claims the priority of U.S. Provisional Application No. 61/458,898, filed on Dec. 3, 2010 and entitled "Full Memory Seat Track Mechanism."

BACKGROUND OF THE INVENTION

1. Field of the Invention

The present invention relates to a seat track assembly for a seat assembly in an automotive vehicle. More particularly, the present invention relates to a seat track assembly allowing sliding movement of a seat assembly to an easy-entry position and including a full memory mechanism for returning the seat assembly to a previously selected seating position.

2. Description of Related Art

Automotive vehicles include seat assemblies for supporting occupants within the vehicle. A typical seat assembly includes a seat cushion and a seat back operatively coupled to the seat cushion by a recliner mechanism for allowing selective pivotal adjustment of the seat back relative to the seat cushion between a plurality of reclined seating positions. Oftentimes, the seat back is also movable to a forwardly inclined or dumped position to allow easier ingress and egress to a rear seat assembly or storage area located behind the seat assembly.

It is common for the seat assembly to include a seat track assembly that slidably interconnects the seat assembly to a floor of the vehicle. The seat track assembly provides longitudinal sliding adjustment of the seat assembly along the floor between a plurality of fore/aft seating positions. The seat track assembly typically includes a lower or fixed track mounted to the floor of the vehicle and an upper or movable track slidably engaging the fixed track. The movable track is mounted to a bottom surface of the seat cushion for sliding movement of the seat assembly along the fixed track. A locking mechanism operatively coupled between the movable and fixed tracks selectively locks the movable track relative to the fixed track to prevent sliding movement of the seat assembly. The locking mechanism is selectively It is also common for the seat assembly to include a Bowden-type cable operatively coupling the seat back to the locking mechanism such that when the seat back is pivoted to the dumped position, the locking mechanism unlocks the movable track from the fixed track. The seat assembly may then be biased forward along the fixed track from a previously selected fore/aft seating position to an easy-entry position, forward of the plurality of fore/aft seating positions, to improve ingress and egress to the rear seat assembly or storage area. When access to the rear seat assembly or storage area is no longer required, the seat assembly is returned rearward along the fixed track toward the plurality of fore/aft seating positions. Typically, however, the seat assembly does not return to the previously selected fore/aft seating position. Rather, the seat assembly returns to a predefined fore/aft seating position and an occupant must then readjust the seat assembly to the previously selected fore/aft seating position.

It is desirable, therefore, to provide a seat track assembly that provides longitudinal sliding adjustment of a seat assembly between a plurality of fore/aft seating positions and an easy-entry position. It is further desirable that the seat track assembly relocate the seat assembly in a previously selected fore/aft seating position when returned from the easy-entry position.

SUMMARY OF THE INVENTION

According to one aspect of the invention, a seat track assembly is provided for moving a seat assembly forward and rearward along a floor in an automotive vehicle. The seat track assembly includes a fixed track fixedly secured to the floor and a movable track fixedly secured to the seat assembly and slidably coupled to the fixed track. A latch mechanism is operatively coupled between the fixed and movable tracks. The latch mechanism prevents sliding movement of the movable track and is selectively disengaged from the fixed track to allow sliding movement of the movable track between a plurality of positions. A memory mechanism is operable between a home position, wherein the memory mechanism is coupled with the movable track and moves therewith during sliding movement of the movable track, and a memory position, wherein the memory mechanism is coupled with the fixed track and defines a previously selected one of the plurality of positions. Actuation of the memory mechanism to the memory position causes the latch mechanism to disengage from the fixed track, thereby allowing sliding movement of the movable track in a first direction away from the previously selected one of the plurality of positions to an easy-entry position. In response to sliding movement of the movable track in a second direction from the easy-entry position the memory mechanism blocks the movable track at the previously selected one of the plurality of positions, thereby allowing the latch mechanism to engage with the fixed track and the memory mechanism to return to the home position. The latch mechanism is independently operable to disengage the latch mechanism from the fixed track when the memory mechanism is in the home position.

According to another aspect of the invention, a seat assembly for supporting an occupant above a floor in an automotive vehicle includes a seat cushion and a seat back operatively coupled to the seat cushion. The seat back is movable between an upright position and a folded position. A seat track assembly includes a fixed track fixedly secured to the floor and a movable track fixedly secured to the seat cushion and slidably coupled to the fixed track. A latch mechanism is operatively coupled between the fixed and movable tracks. The latch mechanism prevents sliding movement of the movable track and is selectively disengaged from the fixed track to allow sliding movement of the seat assembly between a plurality of positions. A memory mechanism is operable between a home position, wherein the memory mechanism is coupled with the movable track and moves therewith during sliding movement of the movable track, and a memory position, wherein the memory mechanism is coupled with the fixed track and defines a previously selected one of the plurality of positions. Moving the seat back to the folded position actuates the memory mechanism to the memory position. An interlock assembly is operatively coupled between the seat back and the seat track assembly for selectively engaging the seat back to maintain the seat back in the folded position during sliding movement of the seat assembly between the previously selected one of the plurality of positions and an easy-entry position. Actuation of the memory mechanism to the memory position disengages the latch mechanism from the fixed track, thereby allowing sliding movement of the seat assembly in a first direction away from the previously selected one of the plurality of positions to the easy-entry position. In response to sliding movement of the seat assembly in a second direction from the easy-entry position the memory mechanism blocks the seat assembly at the previously selected one of the plurality of positions, thereby allowing the latch mechanism to engage with the fixed track and the memory mechanism to return to the home position. The latch mechanism is independently operable to disengage the latch mechanism from the fixed track when the memory mechanism is in the home position.

BRIEF DESCRIPTION OF THE DRAWINGS

Advantages of the present invention will be readily appreciated as the same becomes better understood by reference to the following detailed description when considered in connection with the accompanying drawings wherein:

FIG. 24 is a fragmentary, inner side view of the guide bracket and the memory plate in the memory position;

FIG. 25 is a fragmentary, partially cut-away, inner perspective view of the primary seat track assembly illustrating the slider in the depressed position;

FIG. 26 is a fragmentary, inner side view of the guide bracket and the memory plate in the memory position and the memory tab trapped in the guide slot on the guide bracket; and FIG. 27 is a fragmentary, partially cut away, inner perspective view of the primary seat track assembly illustrating the slider in the depressed position and the memory plate in the memory position.

DETAILED DESCRIPTION OF THE EMBODIMENTS

Figure 1:
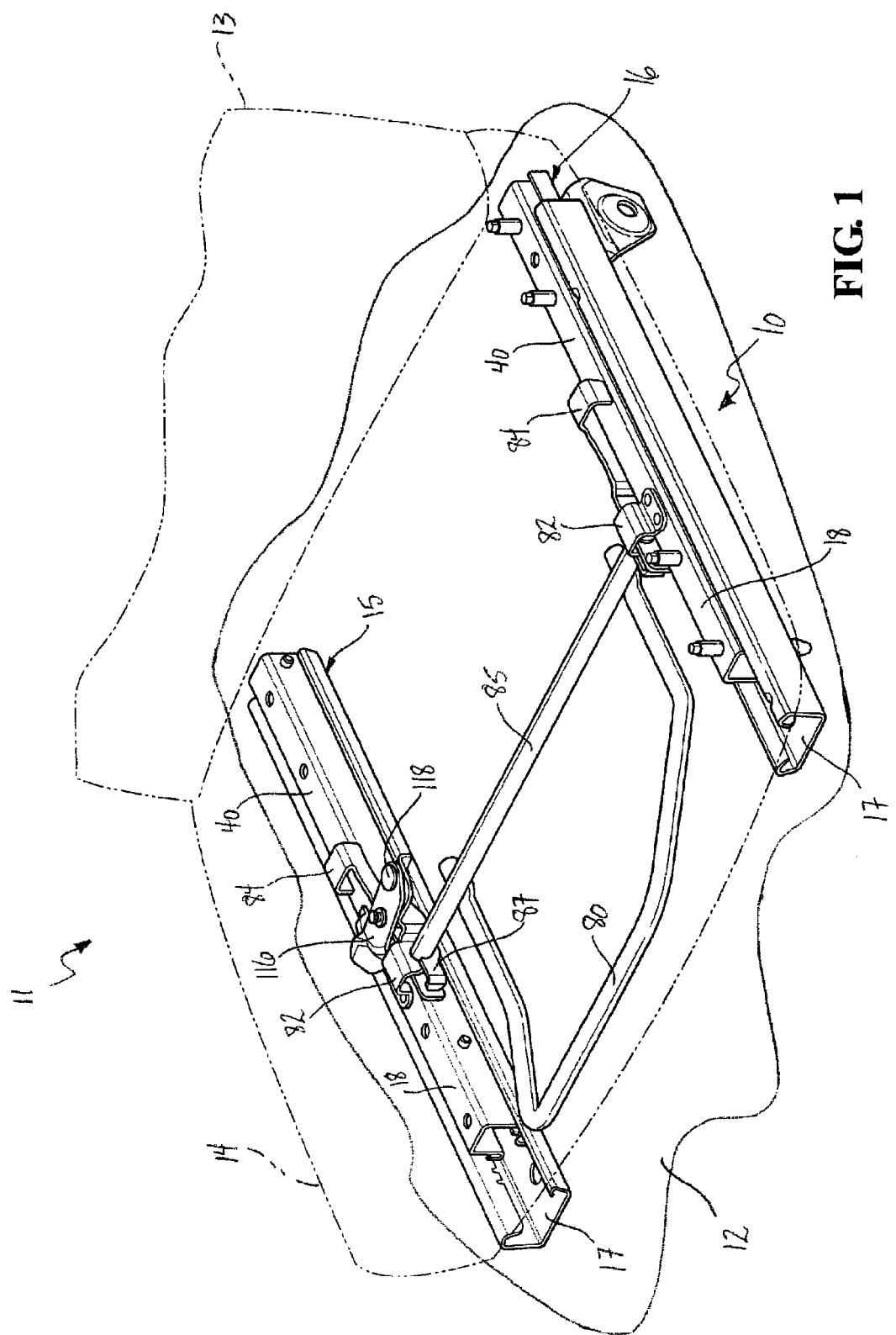
FIG. 1 is a perspective view of a seat assembly including a seat track mechanism having a pair of seat track assemblies.

Referring to the Figures, a seat track mechanism, generally shown at 10, operably interconnects a seat assembly 11 to a floor 12 in an automotive vehicle. As is well known in the vehicle seating art, the seat assembly 11 includes a seat back 13 operatively coupled to a seat cushion 14 allowing selective pivotal adjustment of the seat back 13 relative to the seat cushion 14 between a plurality of reclined seating positions. The seat back 13 is also pivotally movable to a forwardly folded or dumped position to allow easier ingress and egress to a rear seat assembly or storage area located behind the seat assembly 11. The seat track mechanism 10 includes a primary seat track assembly 15 and a secondary seat track assembly 16 which are laterally spaced apart. The primary 15 and secondary 16 seat track assemblies allow selective longitudinal sliding adjustment of the seat assembly 11 among a plurality of fore/aft seating positions along the floor 12 of the vehicle. The primary 15 and secondary 16 seat track assemblies also allow sliding movement of the seat assembly 11 to an access or easy-entry position corresponding with a forwardmost position of the plurality of fore/aft seating positions. When the seat back 13 is pivoted to the dumped position, it is contemplated that the seat assembly will automatically slide forward from a previously selected fore/aft seating position to the easy-entry position. The primary 15 and secondary 16 seat track assemblies are similar, however, only the primary seat track assembly 15 will be described in detail.

The primary seat track assembly 15 includes a lower or fixed track 17 and an upper or movable track 18. The fixed track 17 is adapted to be mounted or fixedly secured to the floor 12 by front and rear risers (not shown). The movable track 18 is adapted to be fixedly secured to an underside of the seat cushion 14 and is slidably coupled to the fixed track 17 for longitudinal sliding movement relative thereto. Thus, when the movable track 18 is caused to slide, the seat assembly 11 moves with it and can be adjusted among the plurality of fore/aft seating positions along the floor 12 of the vehicle.

Figure 3:
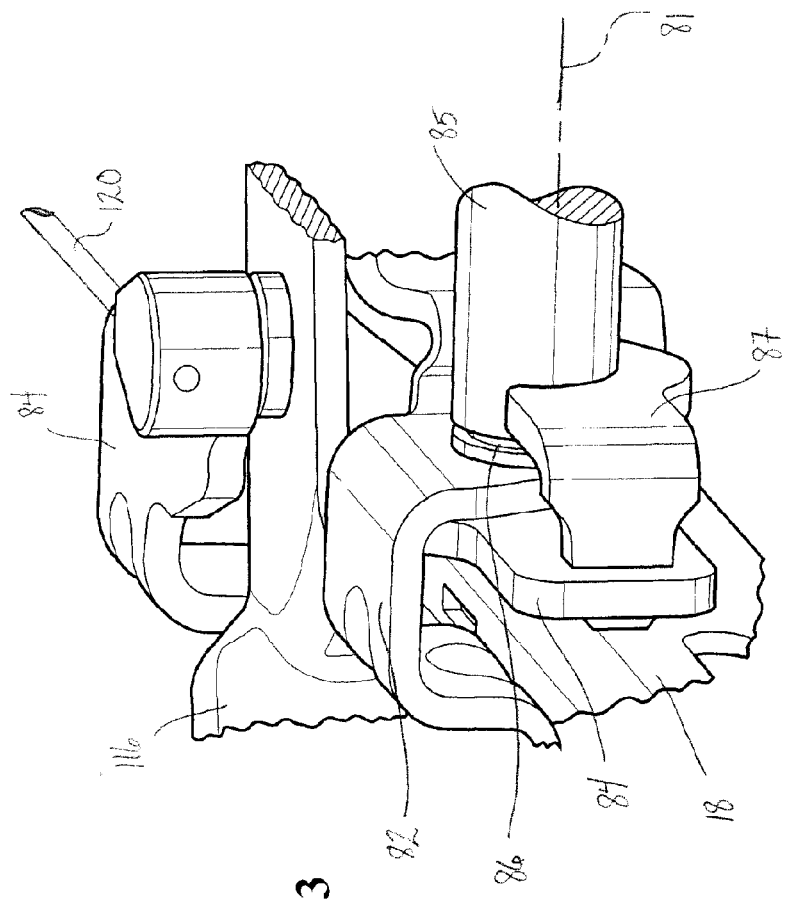
FIG. 3 is a fragmentary, inner perspective view of a portion of the primary seat track assembly.
Figure 6:
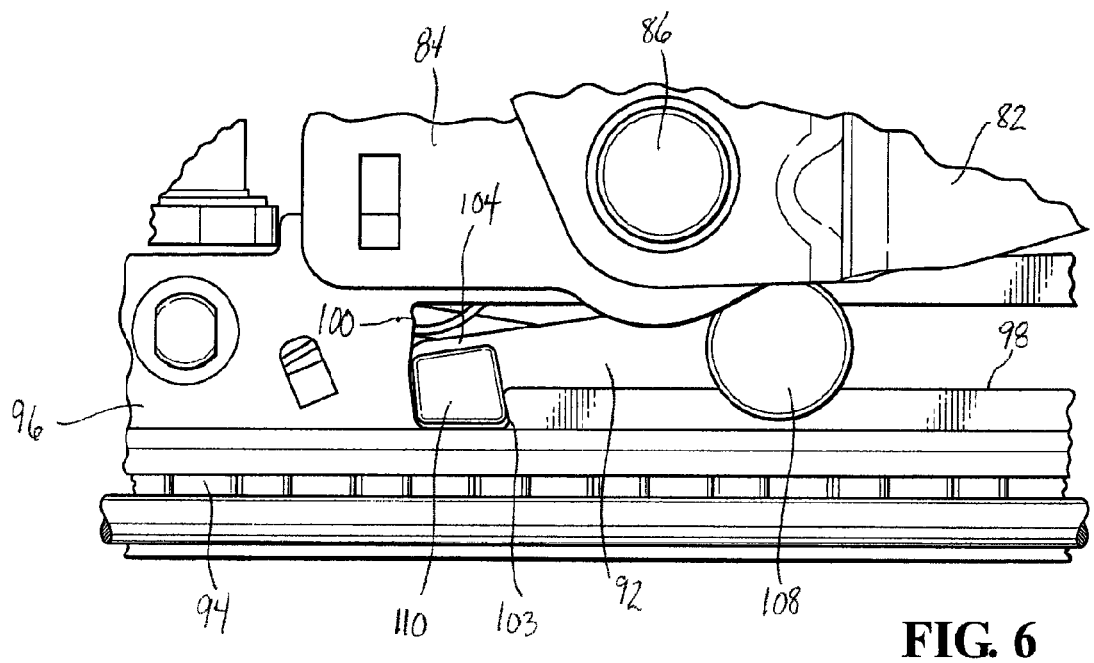
FIG. 6 is a fragmentary, partially cut-away, inner side view of the primary seat track assembly illustrating a memory tab disposed in a recess on the guide bracket.

The profiles or cross-sections of the fixed 17 and movable 18 tracks are described in detail below, however, it is appreciated that any number of track cross-sections could be used without varying from the scope of the invention. Referring to FIGS. 3 and 6, the fixed track 17 has a generally U-shaped cross-section that is defined by a horizontal lower portion 19 extending laterally between upstanding outer side walls 20, 22. The outer side walls 20, 22 each include an end portion 24, 26 extending laterally inward therefrom and terminating at a downward extending flange 28, 30. Each one of the end portions 24, 26 defines a downward-facing bearing surface 32, 34 extending longitudinally along the fixed track 17. In addition, the lower portion 19 defines an upward-facing bearing surface 36, 38 generally adjacent to each one of the outer side walls 20, 22 and extending longitudinally along the fixed track 17.

The movable track 18 has a generally U-shaped cross-section that is inverted relative to the fixed track 17 and is defined by a horizontal upper portion 40 spaced apart from the lower portion 19 of the fixed track 17 and extending laterally between depending inner side walls 42, 44. The inner side walls 42, 44 each include an end portion 46, 48 extending laterally outward therefrom and terminating at an upward extending flange 50, 52. The inner side walls 42, 44 of the movable track 18 interlock with the outer side walls 20, 22 of the fixed track 17. More specifically, the upward extending flanges 50, 52 of the inner side walls 42, 44 are nested within the end portions 24, 26 of the fixed track 17 for sliding engagement of the movable track 18 with the fixed track 17. Each one of the upward extending flanges 50, 52 defines an upward-facing bearing surface 54, 56 extending longitudinally along the movable track 18. In addition, each one of the end portions 46, 48 defines a downward-facing bearing surface 58, 60 extending longitudinally along the movable track 17.

The upward-facing bearing surfaces 54, 56 of the movable track 18 are in opposing relation to the downward-facing bearing surfaces 32, 34 of the fixed track 17 and a plurality of roller bearings 62, 64 is disposed therebetween to provide smooth forward and rearward sliding movement of the movable track 18 relative to the fixed track 17. Similarly, the downward-facing bearing surface 58 of the movable track 18 is in opposing relation to the upward-facing bearing surface 36 of the fixed track 17 and a plurality of roller bearings 66 is disposed therebetween to provide smooth forward and rearward sliding movement of the movable track 18 relative to the fixed track 17. Further, the downward-facing bearing surface 60 of the movable track 18 is in opposing relation to the upward-facing bearing surface 38 of the fixed track 17 and a roller mechanism 68 is disposed therebetween to provide smooth forward and rearward sliding movement of the movable track 18 relative to the fixed track 17.

Figure 2:
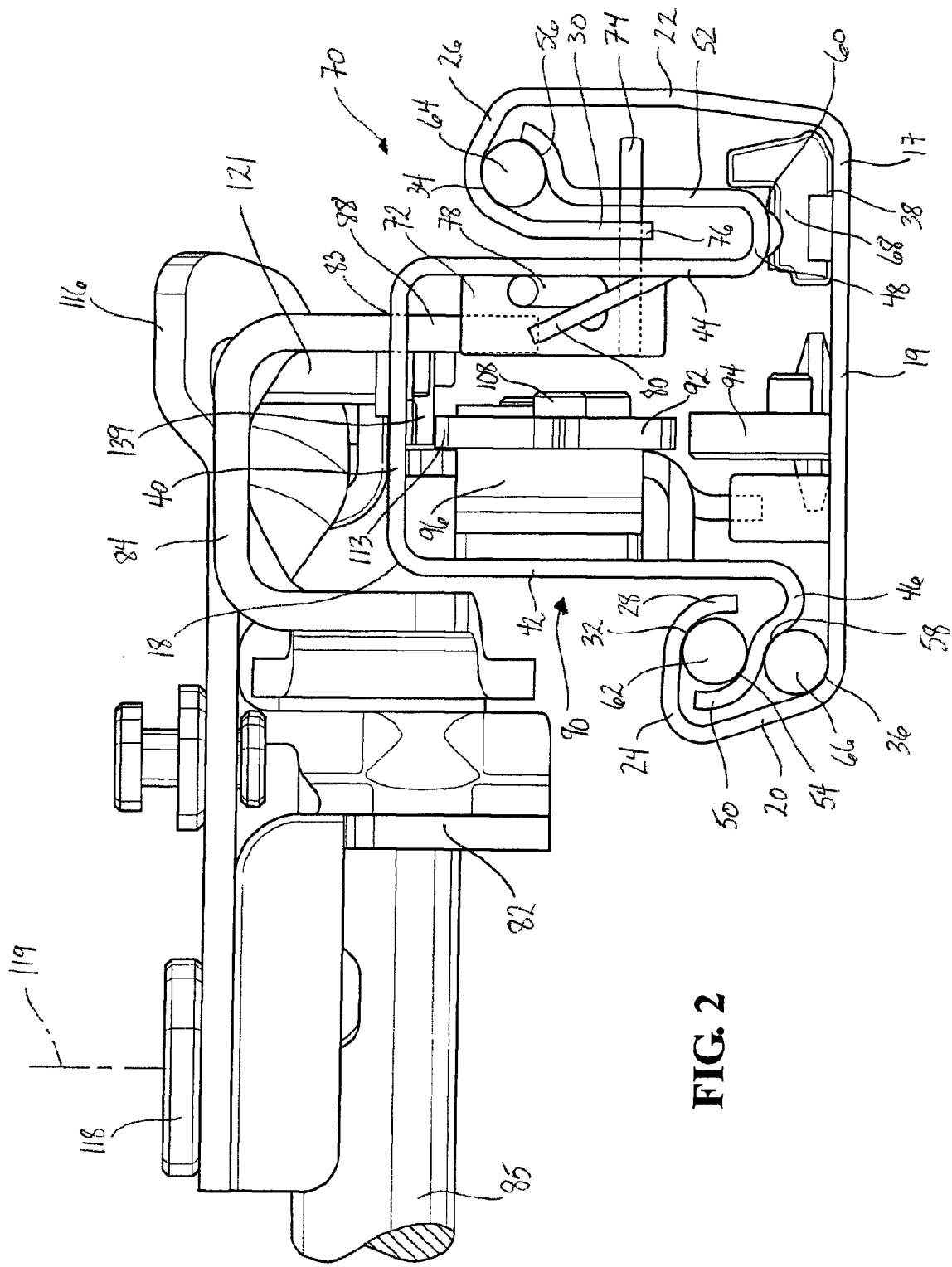
FIG. 2 is a rearward end view of a primary seat track assembly according to a first embodiment of the invention.

The primary seat track assembly 15 includes a latch mechanism, generally shown at 70, for selectively locking the seat assembly in any one of the plurality of fore/aft seating positions. More specifically, the latch mechanism 70 is operatively coupled to the movable track 18 and selectively locks the movable track 18 with the fixed track 17 to prevent forward and rearward sliding movement of the movable track 18 relative to the fixed track 17. The latch mechanism 70 is disposed generally within a space defined between the lower portion 19 of the fixed track 17 and the upper portion 40 of the movable track 18. The latch mechanism 70 includes a latch body 72 that is operatively coupled to an inner surface of the inner side wall 44 of the movable track 18 and is operable between a locked position, shown in FIG. 2, and an unlocked position. A loop latch 74 extends laterally through the inner side wall 44 and the upward extending flange 52 of the movable track 18 and is adapted for engaging a plurality of downward-facing latching teeth 76 spaced longitudinally along the downward extending flange 30 of the fixed track 17. A leaf spring 78 extends longitudinally through the latch body 72 and is coupled to the inner surface of the inner side wall 44 of the movable track 18 at opposite ends by tabs 80 on the movable track 18. The leaf spring 78 biases the latch body 72 upward towards the locked position, shown in FIG. 2, wherein the loop latch 74 engages the latching teeth 76 on the fixed track 17, thereby locking the movable track 18 with the fixed track 17.

The latch body 72 is moved downward, against the bias of the leaf spring 78, to disengage the loop latch 74 from the latching teeth 76 in response to actuating a towel bar 80. More specifically, a mounting bracket 82 is fixedly secured to an upper surface of the upper portion 40 of the movable track 18 and a latch release lever 84 is pivotally coupled to the mounting bracket 82 at pivot 86, which defines a first laterally extending axis 81. The latch release lever 84 includes an arm 88 that extends through an opening 83 in the upper portion 40 of the movable track 18 and is adapted for engaging the latch body 72. The towel bar 80 is coupled to a cross bar 85 that rotates about the first axis 81. The cross bar 85 includes a connecting bracket 87 that connects the cross bar 85 to the latch release lever 84. The towel bar 80 is accessible to a seat occupant at the underside of a forward end of the seat cushion 14. When the towel bar 80 is lifted the latch release lever 84 pivots about pivot 86 and the arm 88 pushes the latch body 72 downward towards the unlocked position, wherein the loop latch 74 is disengaged from the latching teeth 76 of the fixed track 17, thereby unlocking the movable track 18 from the fixed track 17.

The primary seat track assembly 15 also includes a memory mechanism, generally shown at 90, which allows the seat assembly 11 to return to the previously selected fore/aft seating position after the seat assembly 11 is moved to the easy-entry position. The memory mechanism 90 includes a memory plate 92 that selectively engages a tooth rack 94 to identify the previously selected fore/aft seating position. The tooth rack 94 extends longitudinally along the lower portion 19 of the fixed track 17 and is fixedly secured thereto. A guide bracket 96 extends longitudinally and is fixedly secured to an inner surface of the inner side wall 42 of the movable track 18. The guide bracket 96 includes a guide slot 98 extending longitudinally between a forward end 100 and a rearward end 102. A recess 103 at the forward end 100 of the guide slot 98 extends downward therefrom, as shown in FIG. 6. The memory plate 92 is disposed laterally between the guide bracket 96 and the latch body 72. The memory plate 92 extends longitudinally between a front end 104 and a rear end 106 and is pivotally and slidably coupled to the guide slot 98 by a pin 108 located between the front 104 and rear 106 ends thereof. The pin 108 defines a second laterally extending axis 109. A memory tab 110 extends laterally from the front end 104 of the memory plate 92 and is disposed in the guide slot 98. A pair of memory teeth 112 extends downward from the rear end 106 of the memory plate 92 and is adapted for engagement with the tooth rack 94. A flag tab 113 extends upward from the rear end 106 of the memory plate 92, the purpose of which is described below.

Figure 4:
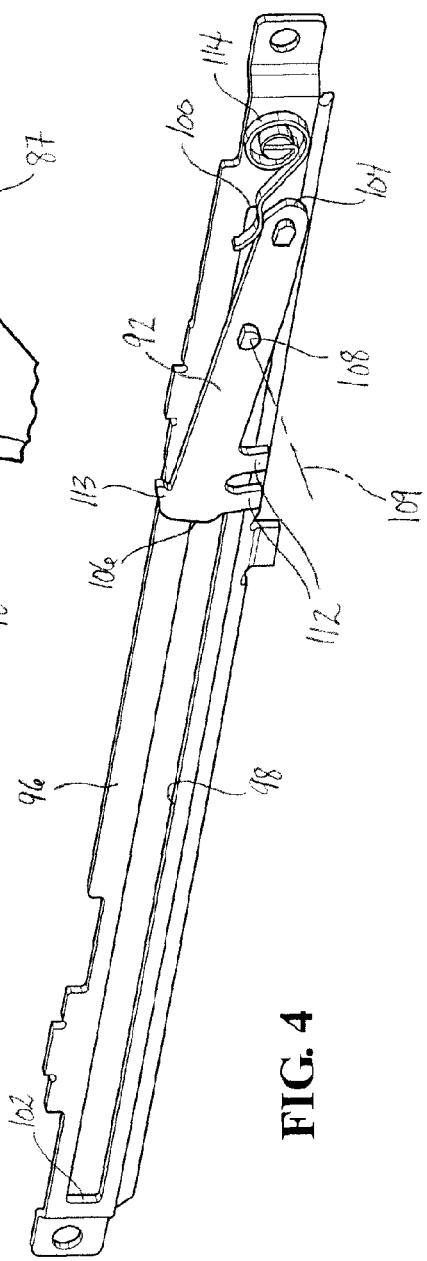
FIG. 4 is an outer perspective view of a guide bracket and a memory plate in a home position.
Figure 5:
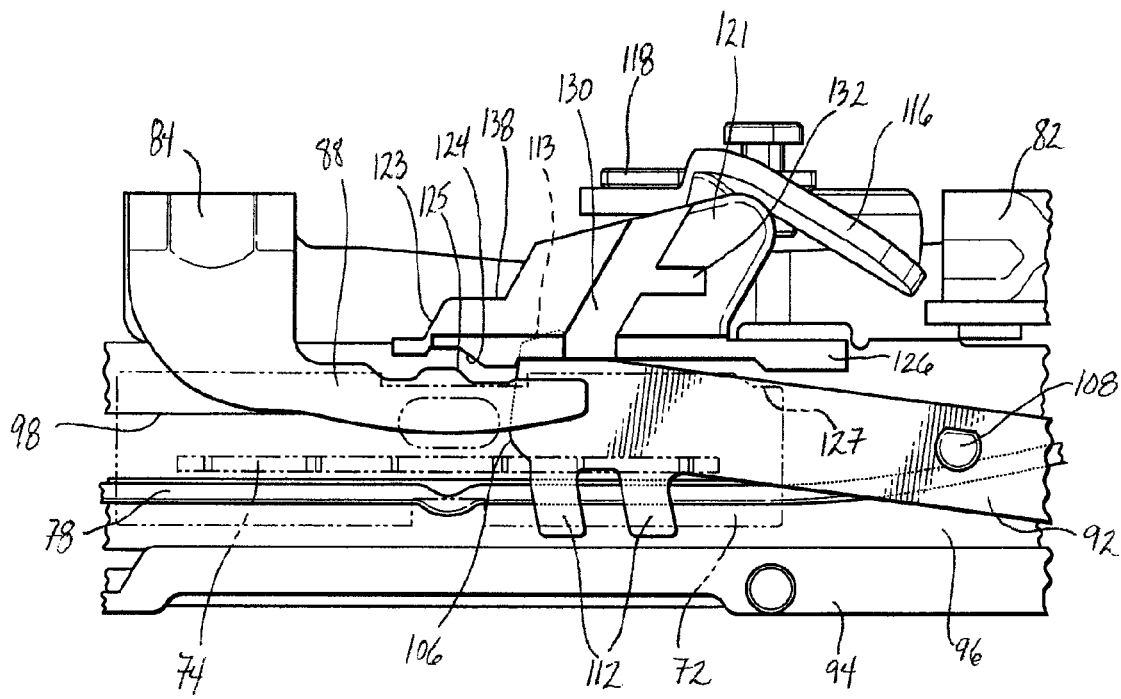
FIG. 5 is a fragmentary, partially cut-away, outer side view of the primary seat track assembly illustrating a slider in a raised position, a latch body in a locked position, and the memory plate in the home position.
Figure 10:
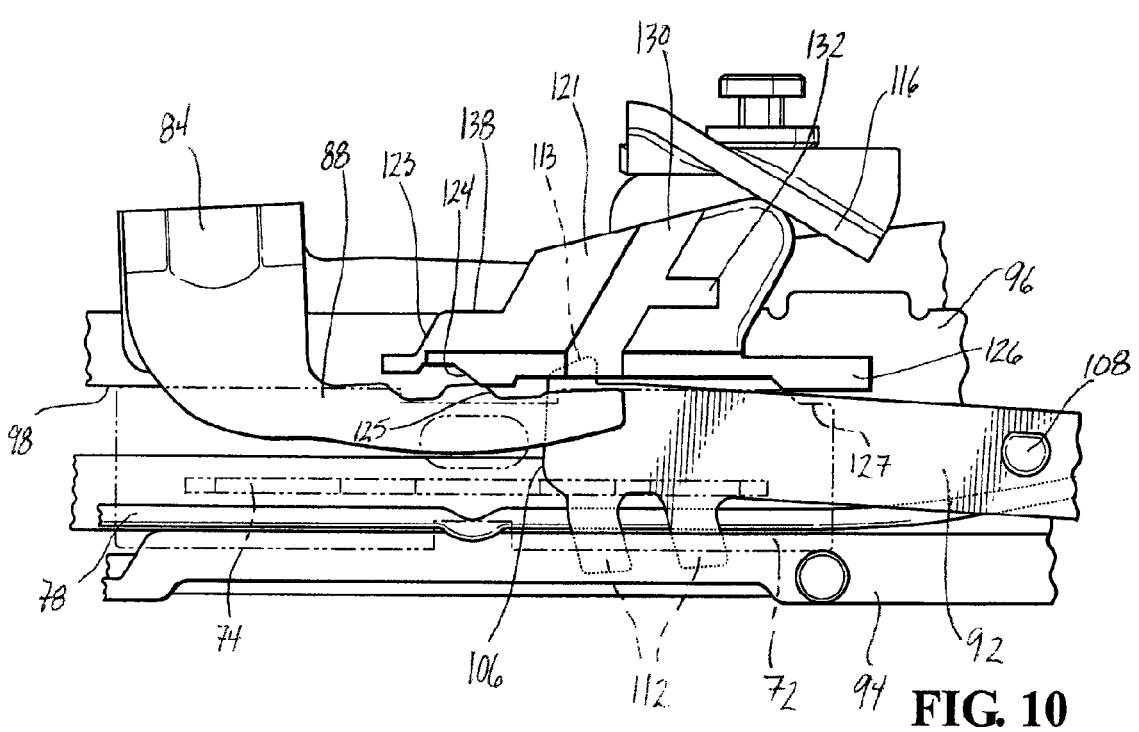
FIG. 10 is a fragmentary, partially cut-away, outer side view of the primary seat track assembly illustrating the slider in a depressed position, the latch body in the unlocked position, and the memory plate in the memory position.
Figure 11:
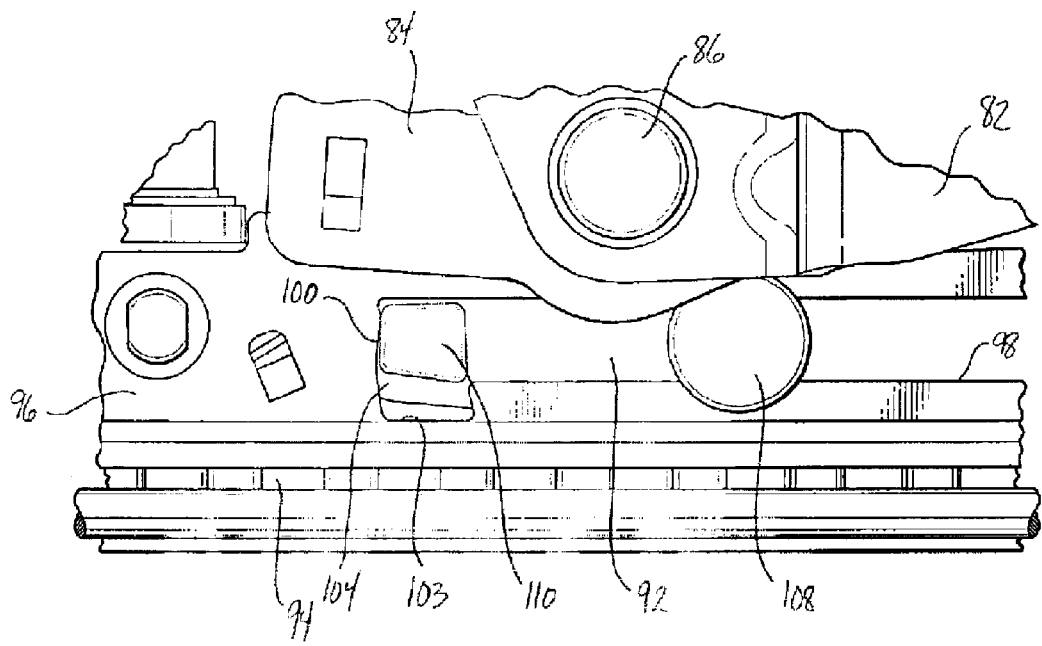
FIG. 11 is a fragmentary, partially cut-away, inner side view of the primary seat track assembly illustrating the memory tab withdrawn from the recess on the guide bracket.

The memory plate 92 pivots about pin 108 between a home position, shown in FIGS. 5 and 6, and a memory position, shown in FIGS. 10 and 11. The memory plate 92 is biased to the home position by a coil spring 114, shown in FIG. 4, that is mounted to the guide bracket 96 adjacent to the forward end 100 of the guide slot 98. The coil spring 114 is adapted to engage the front end 104 of the memory plate 92 to bias the memory tab 110 downward into the recess 103. In the home position, the memory tab 110 is disposed in the recess 103 on the guide bracket 96 and the memory teeth 112 are disengaged from the tooth rack 94. In other words, when the memory plate 92 is in the home position, the memory plate 92 is coupled with the guide bracket 96 and therefore travels with the movable track 18 during sliding movement of the movable track 18 relative to the fixed track 17. Thus, the seat assembly 11 is movable between the plurality of fore/aft seating positions.

Figure 13:
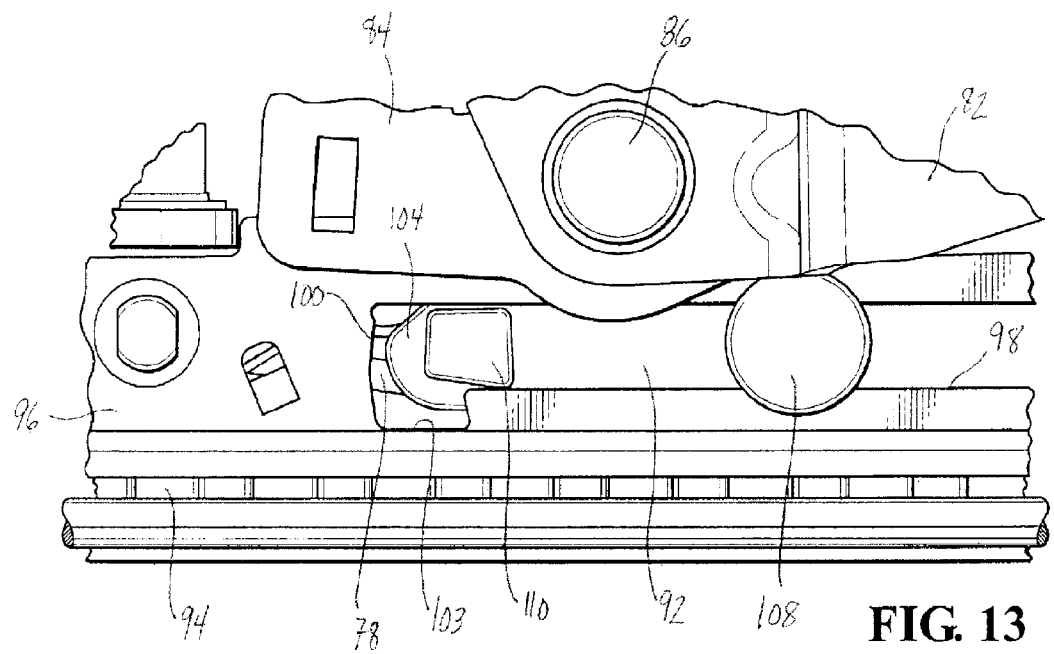
FIG. 13 is a fragmentary, partially cut-away, inner side view of the primary seat track assembly illustrating the memory plate in the memory position and the memory tab trapped in a guide slot on the guide bracket.

In the memory position, the memory tab 110 is withdrawn from the recess 103 on the guide bracket 96 and the memory teeth 112 are engaged with the tooth rack 94 to identify the previously selected fore/aft seating position of the seat assembly 11. With the memory plate 92 in the memory position, the guide bracket 96 and the movable track 18 slide relative to the memory plate 92. In other words, when the memory plate 92 is in the memory position, the memory plate 92 is coupled with the tooth rack 94 and therefore does not travel with the movable track 18 during sliding movement of the movable track 18 relative to the fixed track 17. Thus, the seat assembly 11 is movable between the previously selected fore/aft seating position and the easy-entry position. Further, as shown in FIG. 13, when the memory plate 92 is in the memory position the memory tab 110 is trapped in the guide slot 98 during sliding movement of the movable track 18 as the seat assembly 11 moves between the previously selected fore/aft seating position and the easy-entry position. Thus, the memory plate 92 remains in the memory position until the memory tab 110 returns to the recess 103.

Figure 7:
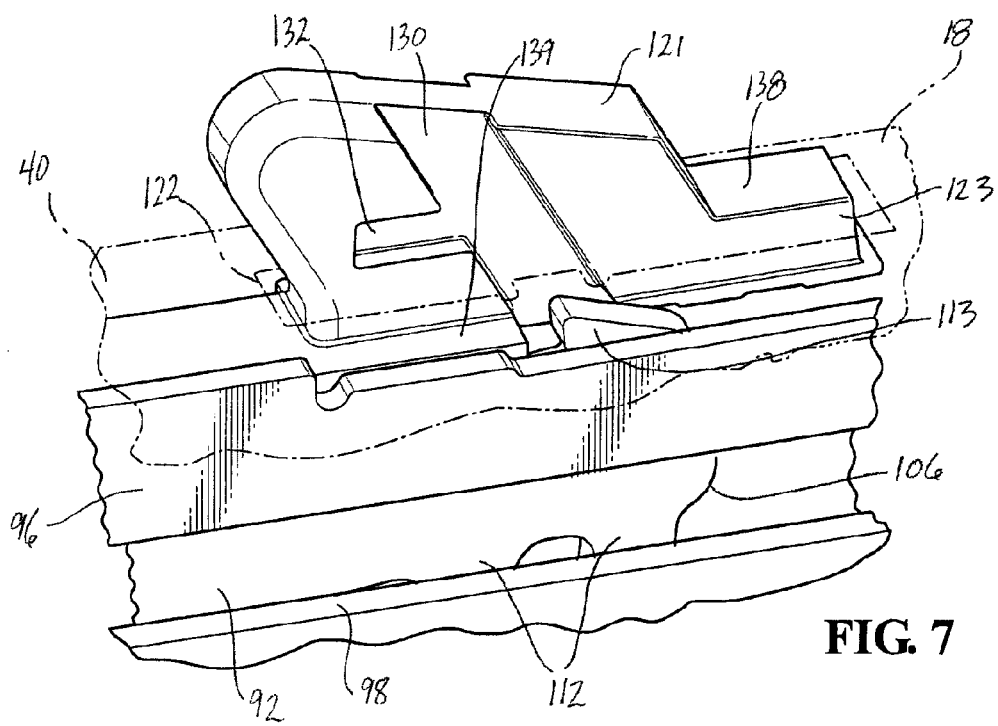
FIG. 7 is a fragmentary, inner perspective view of the primary seat track assembly illustrating the slider in the raised position and the memory plate in the home position.
Figure 12:
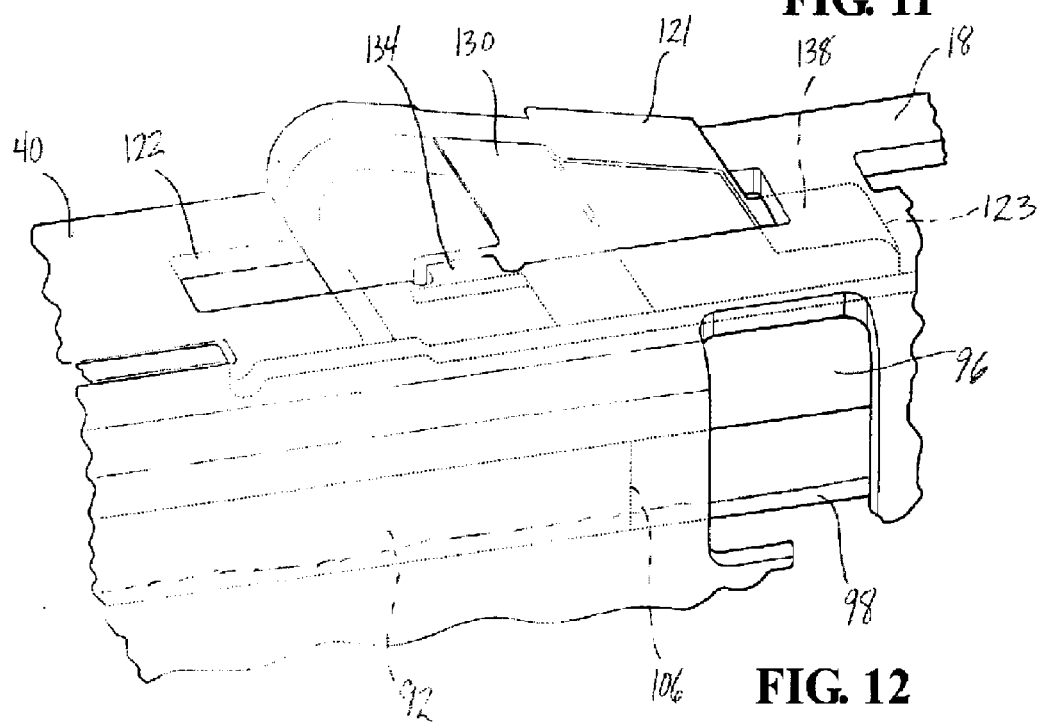
FIG. 12 is a fragmentary, inner perspective view of the primary seat track assembly illustrating the slider in the depressed position.

The memory plate 92 is pivoted from the home position to the memory position in response to pivoting the seat back 13 from one of the reclined seating positions to the dumped position. More specifically, a cam lever 116 is pivotally coupled to the mounting bracket 84 at pivot 118, which defines a vertically extending axis 119. A first Bowden-type cable 120 is operatively coupled between the seat back 13 and the cam lever 116 such that pivoting the seat back 13 to the dumped position causes the cam lever 116 to pivot in a first direction about pivot 118. As the cam lever 116 pivots in the first direction, the cam lever 116 pushes a slider 121 downward and rearward from a raised position, shown in FIG. 7, to a depressed position, shown in FIG. 12. The slider 121 extends through an opening 122 in the upper portion 40 of the movable track 18 and is adapted to contact the memory plate 92 and the arm 88 of the latch release lever 84. When the memory plate 92 is in the home position, the rear end 106 of the memory plate 92 is in contact with an underside of the slider 121 and maintains the slider 121 in the raised position. As the cam lever 116 pushes the slider 121 from the raised position to the depressed position, the slider 121 pushes against the rear end 106 of the memory plate 92 and pivots the memory plate 92 from the home position to the memory position.

Figure 8:
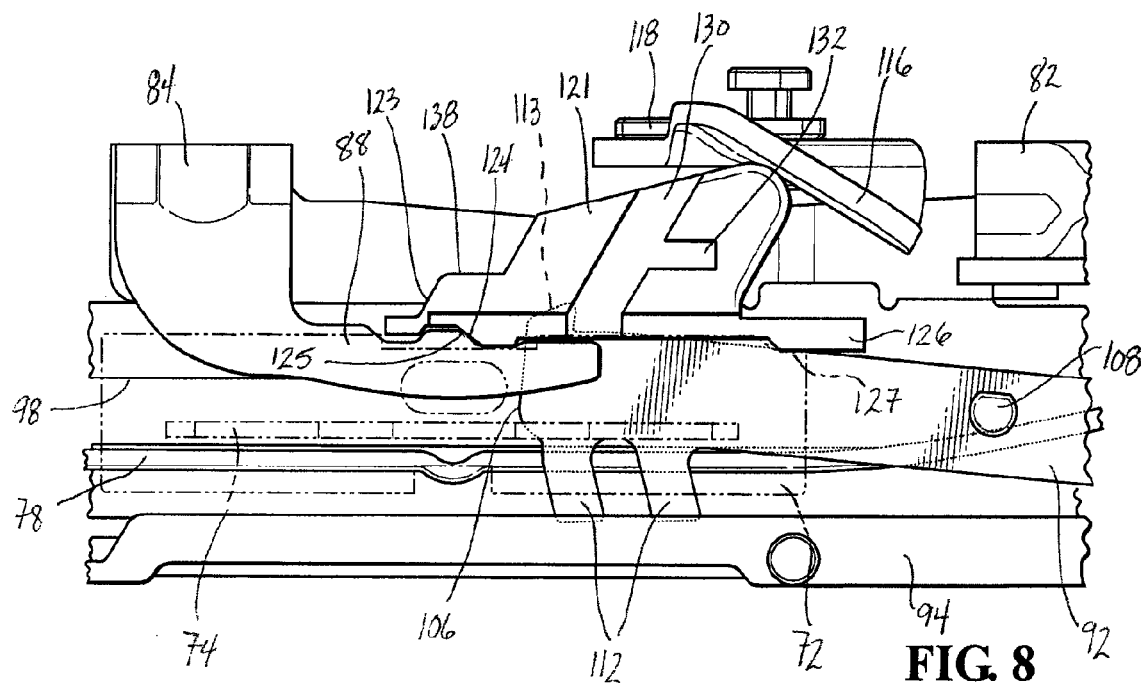
FIG. 8 is a fragmentary, partially cut-away, outer side view of the primary seat track assembly illustrating the slider in a partially depressed position, the latch body in the locked position, and the memory plate in a partially pivoted position.
Figure 9:
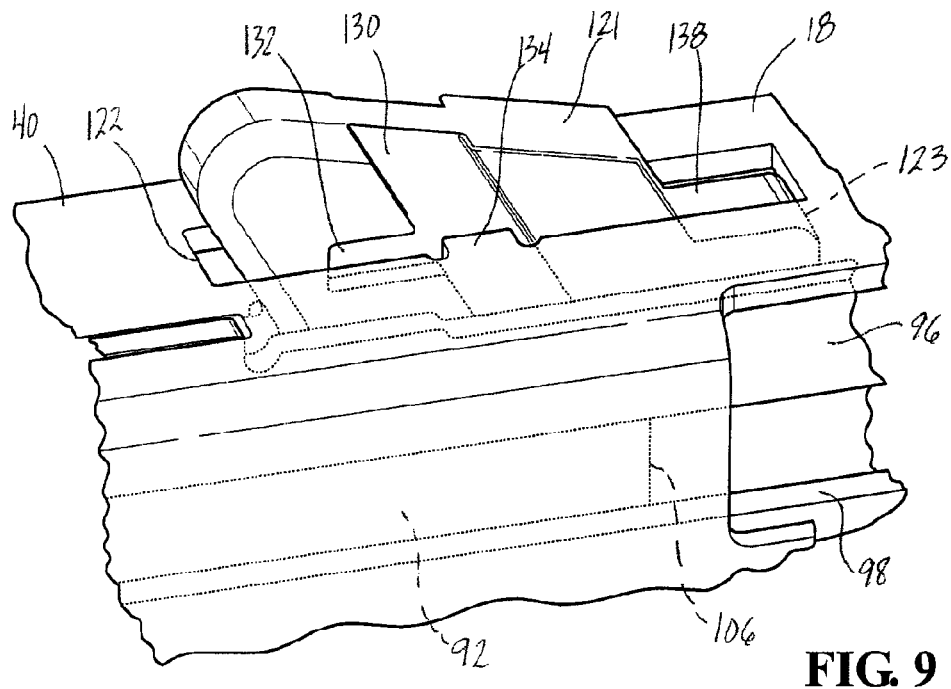
FIG. 9 is a fragmentary, inner perspective view of the primary seat track assembly illustrating the slider in the partially depressed position.

The movement of the slider 121 from the raised position to the depressed position also actuates the latch body 72 from the locked position to the unlocked position. A built-in delay function ensures the memory teeth 112 on the memory plate 92 are engaged with the tooth rack 94 prior to the latch body 72 being actuated to the unlocked position. More specifically, a rearward end 123 of the slider 121 includes a ramped edge 124 facing downward and the arm 88 of the latch release lever 84 includes a ramped edge 125 facing upward, the opposing ramped edges 124, 125 coming into contact as the slider 121 moves from the raised position to the depressed position, as shown in FIG. 8. The ramped edges 124, 125 are configured such that the slider 121 pivots the memory plate 92 to engage the memory teeth 112 with the tooth rack 94 before pivoting the latch release lever 84 to actuate the latch body 72 to the unlocked position. Further, as the ramped edge 124 at the rearward end 123 of the slider 121 comes into contact with the ramped edge 125 of the latch release lever 84, a forward end 126 of the slider 121 comes into contact with an upper edge 127 of the latch body 72 to prevent the slider 121 from pivoting.

At least one side of the slider 121 includes a first groove 130 extending downward and rearward at an angle that corresponds with the downward and rearward movement of the slider 121. A second groove 132 extending generally horizontally is interconnected with the first groove 130 generally midway between opposite ends of the first groove 130. The first groove 130 is aligned with a guide tab 134 formed along an edge of the opening 122 in the upper portion 40 of the movable track 18. As the cam lever 116 pushes the slider 121 downward and rearward, the guide tab 134 cooperates with the first 130 and second 132 grooves to guide the slider 121 from the raised position to the depressed position.

In a first embodiment of the invention, the rearward end 123 of the slider 121 includes a recess or step 138 facing upward that is adapted to maintain the slider 121 in the depressed position while the seat assembly 11 moves between the previously selected fore/aft seating position and the easy-entry position. More specifically, when the slider 121 is in the depressed position, the step 138 is disposed underneath the upper portion 40 of the movable track 18 and prevents the slider 121 from moving upward while the seat assembly 11 moves between the previously selected fore/aft seating position and the easy-entry position. For example, if the seat back 13 is pivoted to an upright position before the seat assembly 11 is returned to the previously selected fore/aft seating position, the cam lever 116 will pivot in a second direction about pivot 118 and the bias of the leaf spring 78 will tend to urge the latch body 72, the arm 88 of the latch release lever 84, and the slider 121 upward. This will result in the latch body 72 returning to the locked position before the seat assembly 11 is returned to the previously selected fore/aft seating position. However, with the step 138 disposed underneath the upper portion 40 of the movable track 18, the slider 121 is prevented from moving upward and remains in the depressed position, which in turn maintains the latch body 72 in the unlocked position. In other words, the step 138 acts as a hold-open feature for the latch mechanism 70.

The step 138 is moved from underneath the upper portion 40 of the movable track 18 in response to contact of the slider 121 with the flag tab 113 on the memory plate 92 as the seat assembly 11 is returned from the easy-entry position to the previously selected fore/aft seating position. More specifically, as the seat assembly 11 is returned rearward to the previously selected fore/aft seating position a shoulder 139 on the slider 121, shown in FIGS. 2 and 7, contacts the flag tab 113 on the memory plate 92. Since the memory plate 92 is in the memory position coupled with the tooth rack 94, the memory plate 92 is prevented from moving, and contact between the shoulder 139 and the memory plate 92 causes the slider 121 to move forward such that the step 138 is withdrawn from underneath the upper portion 40 of the movable track 16 and the slider 121 is then free to return to the raised position.

In operation, beginning with the memory plate 92 in the home position such that the memory teeth 112 are disengaged from the tooth rack 94, the primary seat track assembly 15 is freely adjustable to move the seat assembly 11 between the plurality of fore/aft seating positions by lifting the towel bar 80. When the towel bar 80 is lifted, the latch release lever 84 pivots about pivot 86 and the arm 88 pushes the latch body 72 downward from the locked position to the unlocked position. With the latch body 72 in the unlocked position, the loop latch 74 is disengaged from the latching teeth 76 on the fixed track 17 and the movable track 18 is free to slide relative to the fixed track 17. As the movable track 18 slides relative to the fixed track 17, the memory plate 92, which is in the home position, travels therewith. Once a particular fore/aft seating position is selected, the towel bar 80 is released and the leaf spring 78 returns the latch body 72 to the locked position. With the latch body 72 in the locked position, the loop latch 74 is engaged with the latching teeth 76 on the fixed track 17, thereby locking the movable track 18 relative to the fixed track 17.

When access for ingress or egress to the rear seat assembly or storage area is desired, the seat back 13 is actuated to the dumped position. As the seat back 13 pivots forward to the dumped position, the first cable 120 causes the cam lever 116 to pivot in the first direction about pivot 118. As the cam lever 116 pivots in the first direction, the cam lever 116 pushes the slider 121 downward and rearward and the guide tab 134 on the movable track 16 cooperates with the first 130 and second 132 grooves on the slider 121 to guide the slider 121 from the raised position to the depressed position. Movement of the slider 121 from the raised position to the depressed position pivots the memory plate 92 about pivot 108 from the home position to the memory position, wherein the memory teeth 112 are engaged with the tooth rack 94 to identify the previously selected fore/aft seating position. As the memory teeth 112 on the memory plate 92 engage with the tooth rack 94, the ramped edge 124 on the slider 121 comes into contact with the ramped edge 125 on the arm 88 and pivots the latch release lever 84 about pivot 86 to actuate the latch body 72 from the locked position to the unlocked position. With the memory plate 92 in the memory position and the latch body 72 in the unlocked position, the movable track 18 is slid forward relative to the fixed track 17 to move the seat assembly 11 from the previously selected fore/aft seating position to the easy-entry position.

To return the seat assembly 11 to the previously selected fore/aft seating position, the movable track 18 is slid rearward relative to the fixed track 17 until the shoulder 139 on the slider 121 contacts the flag tab 113 on the memory plate 92, which causes the slider 121 to move forward, thereby withdrawing the step 138 from underneath the upper portion 40 of the movable track 18. The forward end 100 of the guide slot 98 then contacts the memory tab 110 of the memory plate 92, which stops the seat assembly 11 in the previously selected fore/aft seating position. After the seat assembly 11 is stopped in the previously selected fore/aft seating position, continued rearward force applied to the seat back 13 pivots the seat back 13 to the upright position. As the seat back 13 pivots to the upright position, the cam lever 116 pivots in the second direction about pivot 118 and the bias of the leaf spring 78 moves the latch body 72 upward into the locked position. As the latch body 72 moves upward, the arm 88 of the latch release lever 84 moves the slider 121 upward into the raised position. At the same time, the coil spring 114 pushes the front end 104 of the memory plate 92 downward, which pivots the memory plate 92 about pin 108 until the memory tab 110 is disposed in the recess 103 on the guide bracket 96. The memory plate 92 is now in the home position and the movable track 18 is locked relative to the fixed track 17.

Figure 15:
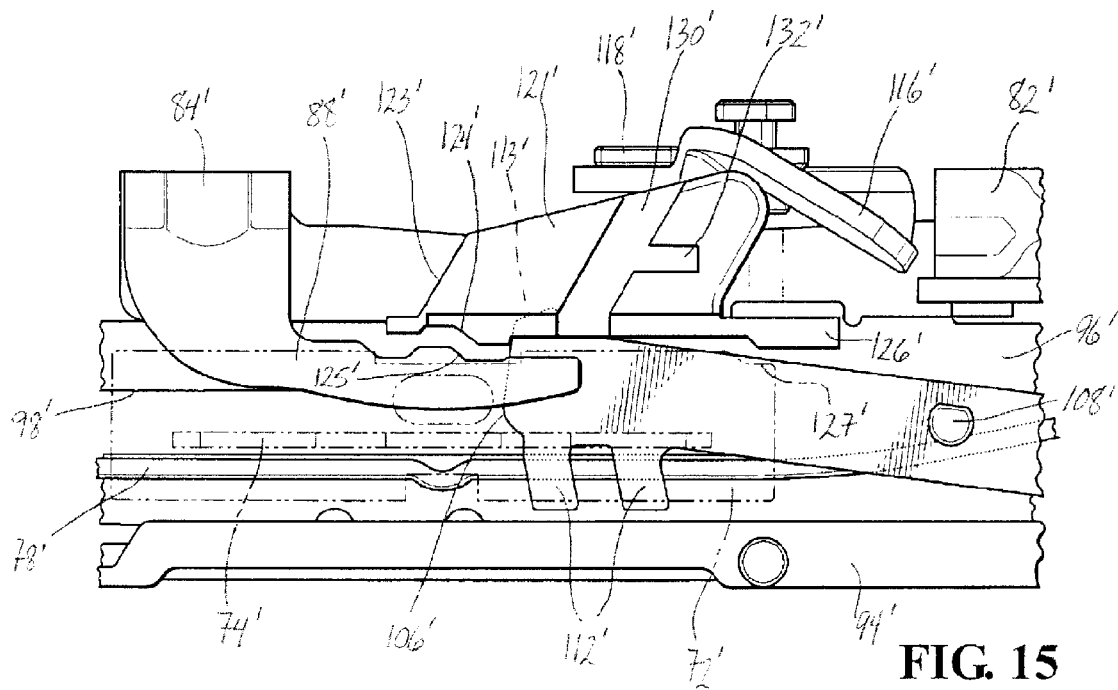
FIG. 15 is a fragmentary, partially cut-away, outer side view of the primary seat track assembly shown in FIG. 14 illustrating a slider in the raised position, the latch body in the locked position, and the memory plate in the home position.
Figure 14:
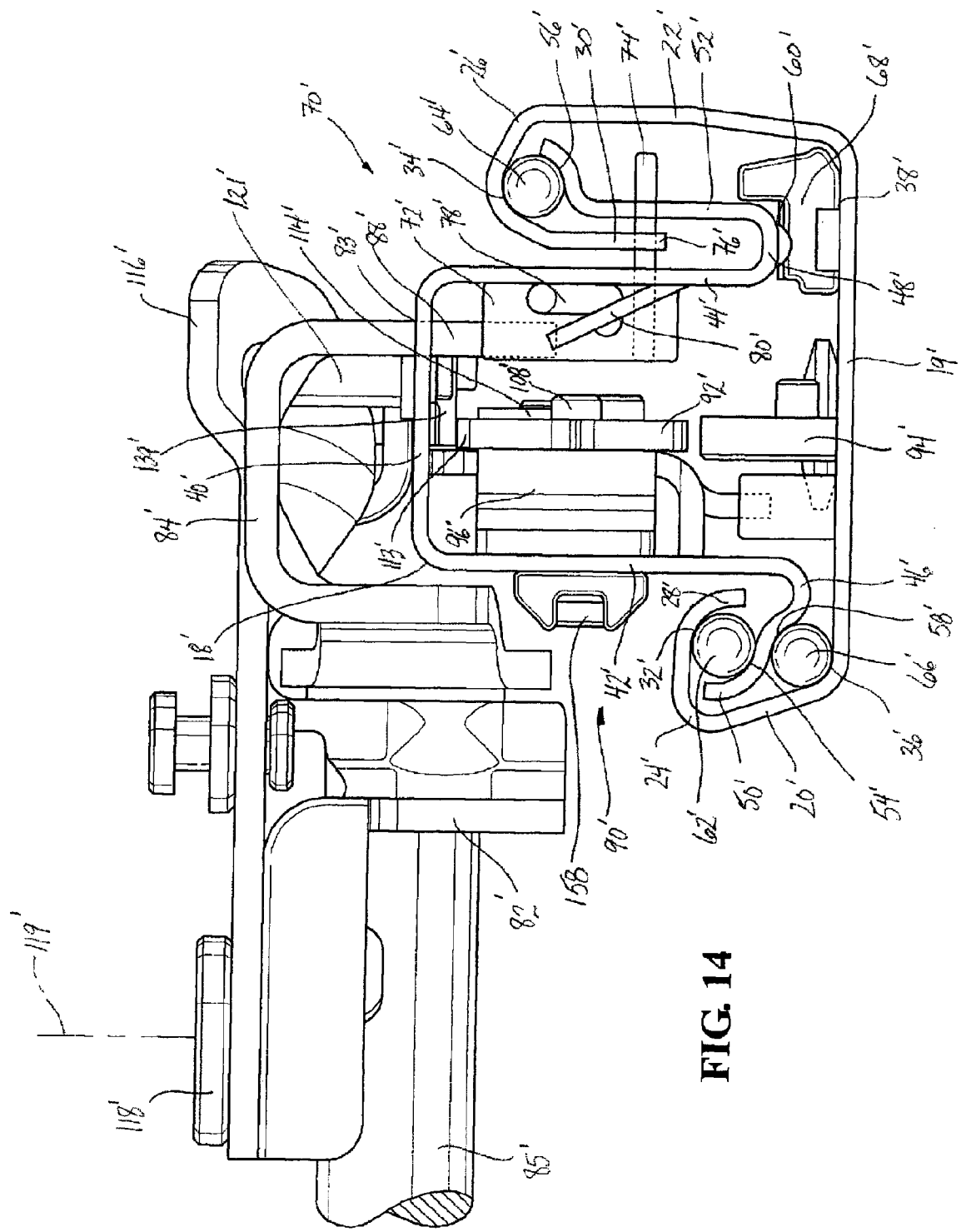
FIG. 14 is a rearward end view of the primary seat track assembly according to a second embodiment of the invention.
Figure 16:
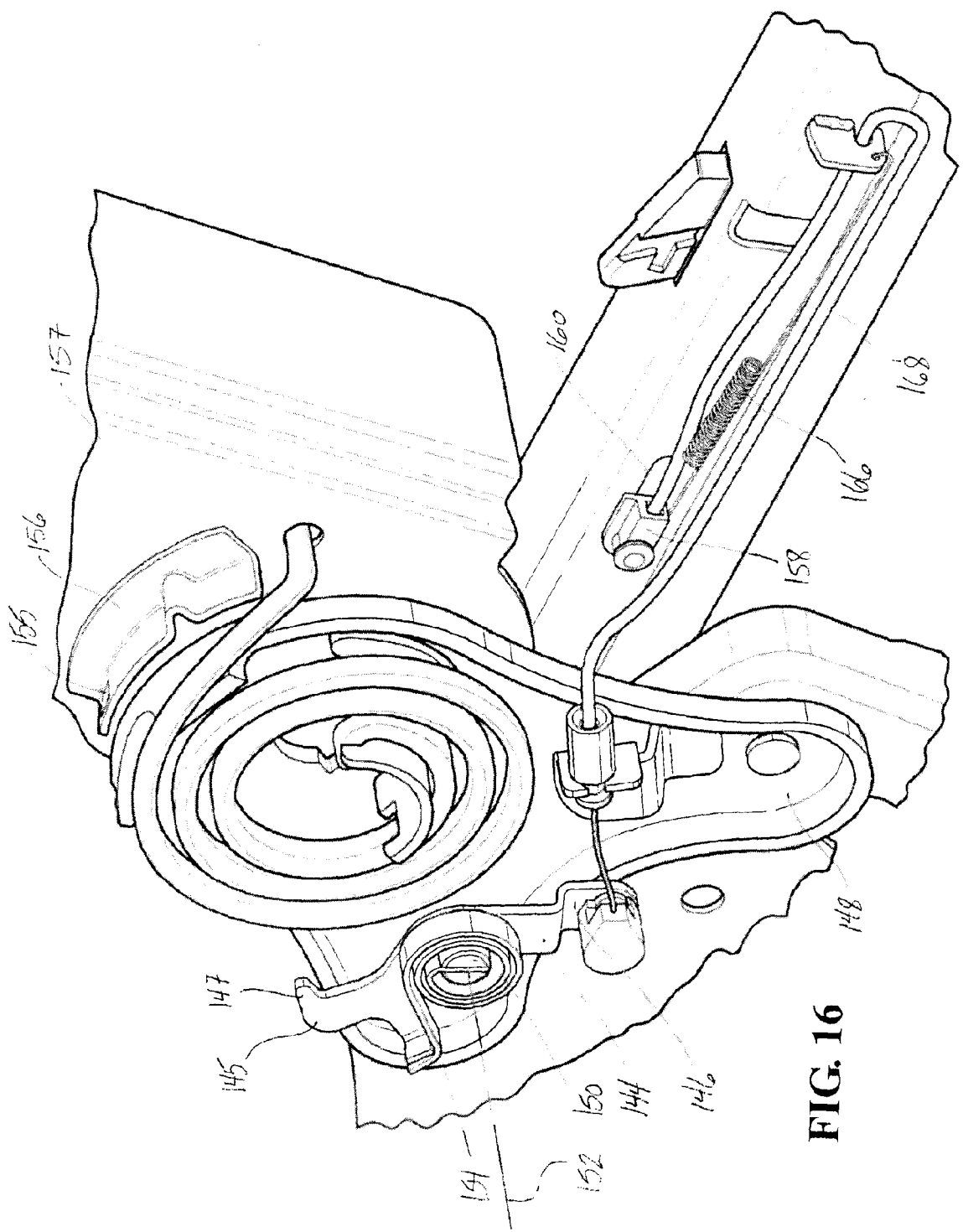
FIG. 16 is a fragmentary, perspective view of the seat assembly illustrating an interlock assembly including a hook lever pivoted away from engagement with a seat back bracket and an interlock slider in a first position.
Figure 17:
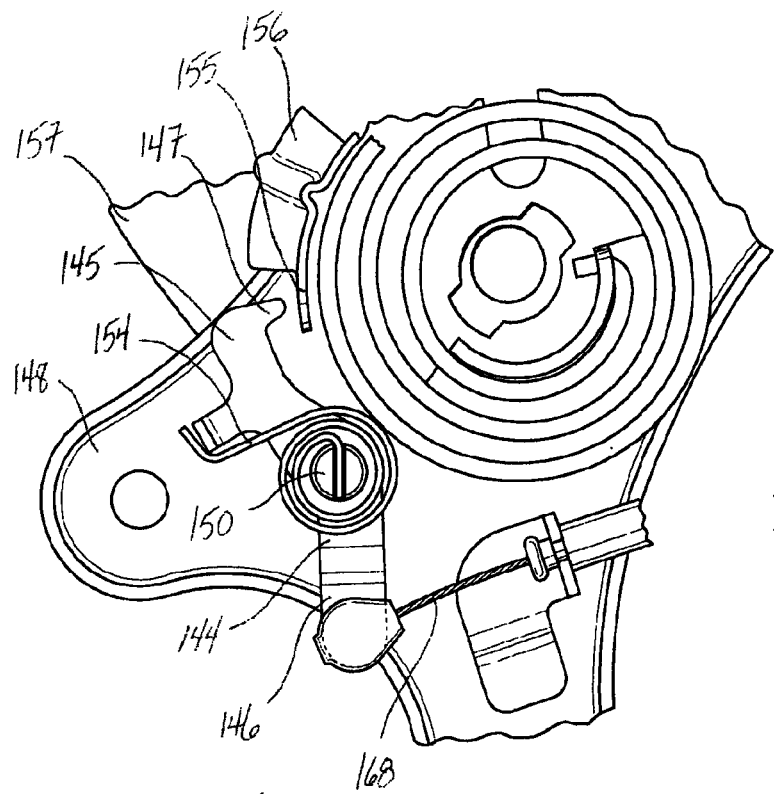
FIG. 17 is a fragmentary, outer side view of the seat assembly illustrating the hook lever disengaged from the seat back bracket.

Referring to FIGS. 14 through 20, wherein like primed reference numerals represent similar elements as those described above, in a second embodiment of the invention the slider 121' does not include the step 138, as is best seen in FIG. 15. Therefore, if the seat back 13' is pivoted to the upright position before the seat assembly 11' is returned to the previously selected fore/aft seating position, the cam lever 116' will pivot in the second direction about pivot 118' and the bias of the leaf spring 78' will tend to urge the latch body 72', the arm 88' of the latch release lever 84', and the slider 121' upward. This will result in the latch body 72' returning to the locked position before the seat assembly 11' is returned to the previously selected fore/aft seating position. However, an interlock assembly, generally shown at 142, is provided to prevent the seat back 13' from pivoting to the upright position before the seat assembly 11' is returned to the previously selected fore/aft seating position. Thus, with the seat back 13' in the dumped position, the cam lever 116' prevents the slider 121' from moving upward such that the slider 121' remains in the depressed position, which in turn maintains the latch body 72' in the unlocked position.

The interlock assembly 142 is operatively coupled between the seat back 13' and the primary seat track assembly 15'. The interlock assembly 142 includes a hook lever 144 extending between an upper end 145 and a lower end 146. The upper end 145 of the hook lever 144 includes a hook 147. The hook lever 144 is pivotally coupled between the upper and lower ends 145, 146 to a seat cushion bracket 148 at pivot 150, which defines a third laterally extending axis 152. The hook lever 144 is biased by a clock spring 154 towards engagement with an opening 155 in a bracket 156 that is fixedly secured to a seat back bracket 157. Engagement of the hook 147 at an upper end 145 of the hook lever 144 with the opening 155 when the seat back 13' is in the dumped position generally prevents the seat back 13' from pivoting to the upright position.

Figure 19:
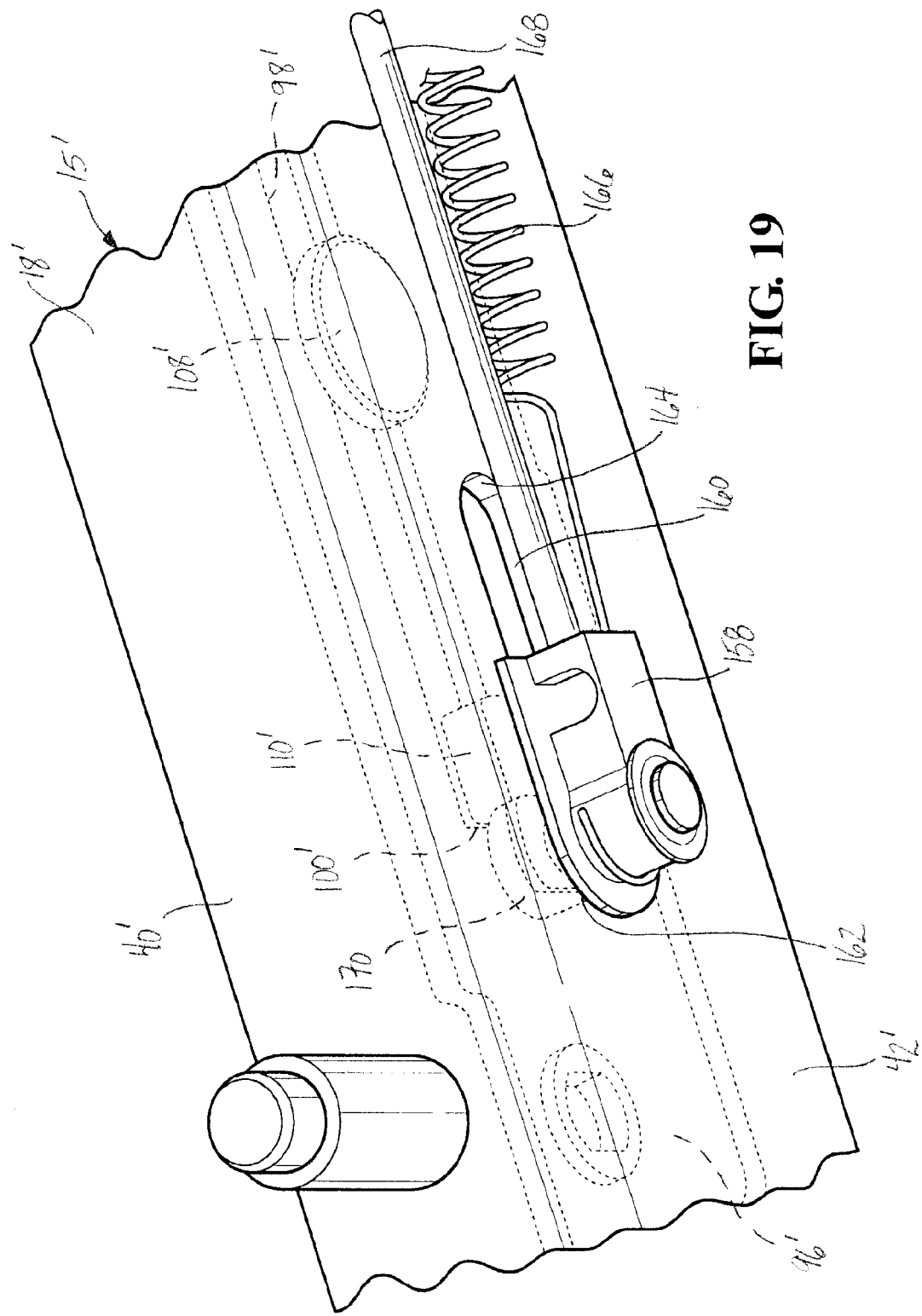
FIG. 19 is a fragmentary, inner perspective view of the primary seat track assembly illustrating the interlock slider in the first position.

The interlock assembly 142 also includes an interlock slider 158 that is slidably coupled to an interlock slot 160 in the inner side wall 42' of the movable track 18', as shown in FIG. 19. The interlock slot 160 is disposed generally adjacent to the forward end 100' of the guide slot 98'. The interlock slot 160 extends longitudinally between a first end 162 disposed in the direction of the forward end 100' of the guide slot 98' and a second end 164 disposed in the direction of the rearward end 102' of the guide slot 98'. The interlock slider 158 is biased by an extension spring 166 toward the second end 164 of the interlock slot 160. A second Bowden-type cable 168 is operatively coupled between the lower end 146 of the hook lever 144 and the interlock slider 158. The interlock slider 158 includes an interlock pin 170 that extends laterally toward the guide bracket 96' and is adapted for contact with the memory tab 110' on the memory plate 92'.

When the memory plate 92' is in the home position, the memory tab 110' contacts the interlock pin 170 and maintains the interlock slider 158 at the first end 162 of the interlock slot 160. With the interlock slider 158 at the first end 162 of the interlock slot 160, a tension is applied to the second cable 168 such that the hook lever 144 is pivoted about pivot 150 against the bias of the clock spring 154 away from engagement with the opening 155 in the bracket 156.

Figure 18:
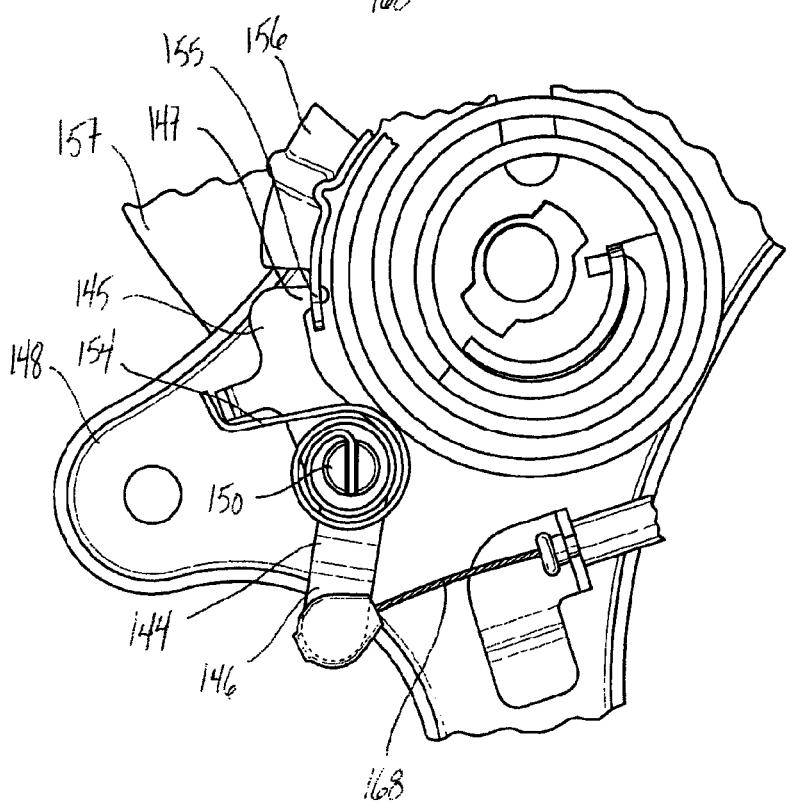
FIG. 18 is a fragmentary, outer side view of the seat assembly illustrating the hook lever engaged with the seat back bracket.

When the seat back 13' is pivoted to the dumped position, the memory plate 92' is in the memory position and the latch body 72' is in the unlocked position to allow the movable track 18' to slide forward relative to the fixed track 17' to move the seat assembly 11' from the previously selected fore/aft seating position to the easy-entry position. As the movable track 18' slides forward, the memory plate 92' and the memory tab 110' remain stationary with the fixed track 17', which allows the extension spring 166 to move the interlock slider 158 to the second end 164 of the interlock slot 160. With the interlock slider 158 at the second end of the interlock slot 160, the tension from the second cable 168 is released and the clock spring 154 pivots the hook lever 144 about pivot 150 to engage the hook 147 with the opening 155 in the bracket 156, as shown in FIG. 18. Thus, the seat back 13' is maintained in the dumped position while the seat assembly 11' travels between the previously selected fore/aft seating position and the easy-entry position.

The hook 147 is released from the opening 155 in the bracket 156 when the seat assembly 11' is returned from the easy-entry position to the previously selected fore/aft seating position. More specifically, as the seat assembly 11' is returned rearward to the previously selected fore/aft seating position, the interlock pin 170 contacts the memory tab 110' which causes the interlock slider 158 to move from the second end 164 to the first end 162 of the interlock slot 160. With the interlock slider 158 at the first end 162 of the interlock slot 160, the tension is re-applied to the second cable 168 such that the hook lever 144 is pivoted about pivot 150 against the bias of the clock spring 154 to disengage the hook 147 from the opening 155 in the bracket 156. The seat back 13' is now free to pivot to the upright position.

It is contemplated that engagement between the hook 147 and the opening 155 in the bracket 156 generally prevents the seat back 13' from pivoting to the upright position until the seat assembly 11' is returned from the easy-entry position to the previously selected fore/aft seating position, as described above. However, if enough force is applied to the seat back 13' during movement of the seat assembly 11' between the easy-entry position and the previously selected fore/aft seating position, the engagement between the hook 147 and the opening 155 in the bracket 156 will be overcome to allow the seat back 13' to return to the upright position. Thus, it is possible to return the latch body 72' to the locked position before the seat assembly 11' is returned to the previously selected fore/aft seating position.

Figure 20:
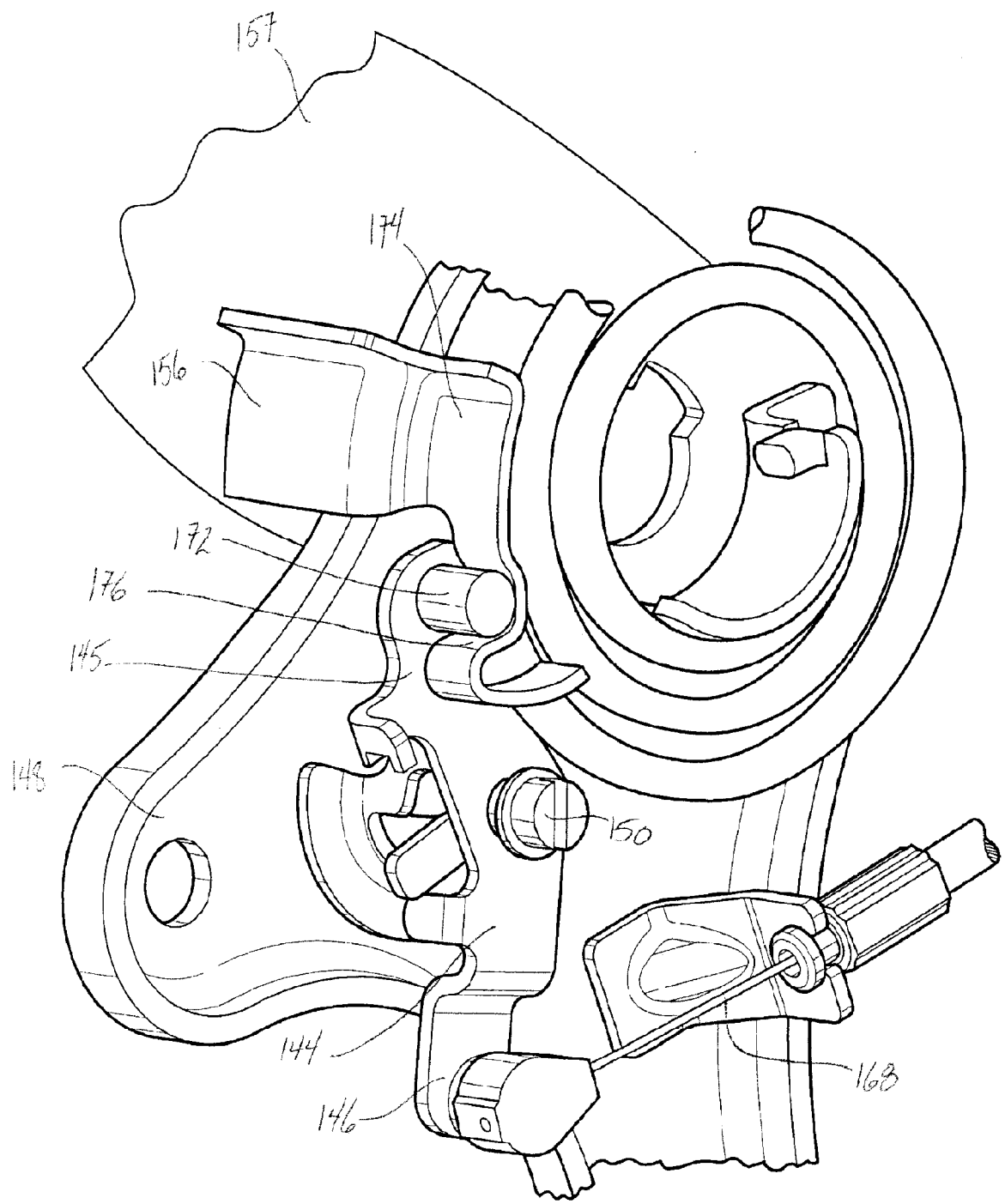
FIG. 20 is a fragmentary, outer perspective view of the seat assembly illustrating an alternative version of the interlock assembly including a hook lever having a post engaged with a detent feature on the seat back bracket.
Figure 21:
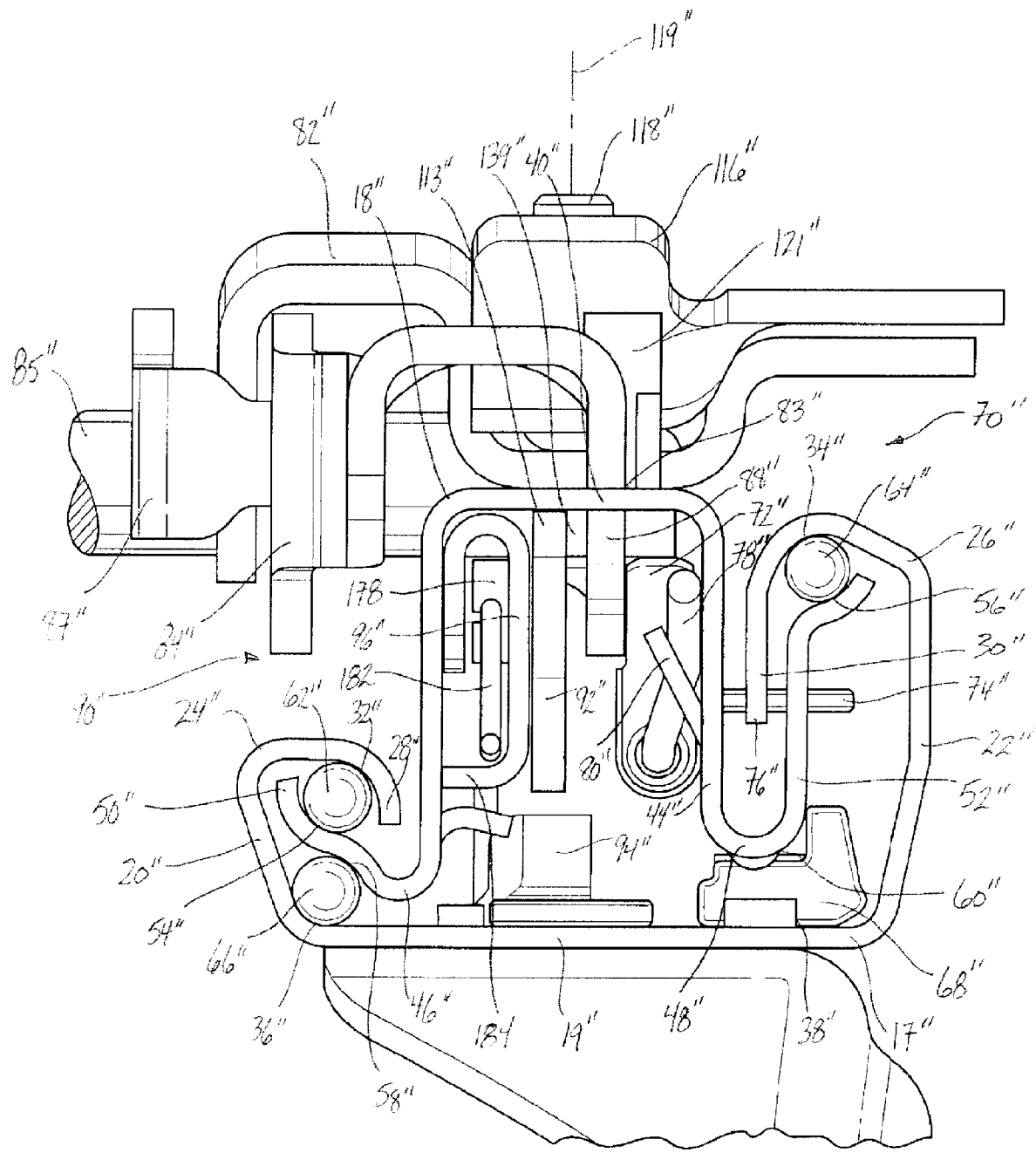
FIG. 21 is a rearward end view of the primary seat track assembly according to a third embodiment of the invention illustrating the slider in the raised position, the latch body in the locked position, and the memory plate in the home position.

Referring to FIG. 20, an alternative version of the interlock assembly 142' is shown. Rather than the hook 147, the upper end 145 of the hook lever 144 includes a post 172 extending laterally therefrom. The hook lever 144 is biased by the clock spring (not shown) towards engagement with a detent feature 174 that is flexibly coupled to the bracket 156, which is fixedly secured to the seat back bracket 157.

When the seat back 13' is pivoted to the dumped position and the interlock slider 158 is at the second end of the interlock slot 160, the tension from the second cable 168 is released and the clock spring pivots the hook lever 144 about pivot 150 to engage the post 172 with a pocket 176 formed in the detent feature 174. Thus, the seat back 13' is maintained in the dumped position while the seat assembly 11' travels between the previously selected fore/aft seating position and the easy-entry position. The post 172 is released from the pocket 176 in the detent feature 174 when the seat assembly 11' is returned from the easy-entry position to the previously selected fore/aft seating position.

The detent feature 174 is designed such that if enough force is applied to the seat back 13' while the post 172 is engaged with the pocket 176, the detent feature 174 will deflect and release the post 172 from the pocket 176 to allow the seat back 13' to return to the upright position. Thus, it is possible to return the latch body 72' to the locked position before the seat assembly 11' is returned to the previously selected fore/aft seating position.

Referring to FIGS. 21 through 27, wherein like double-primed reference numerals represent similar elements as those described above, in a third embodiment of the invention the memory plate 92" is slidably coupled to the guide slot 98" by a memory tab 178 rather than pivotally and slidably coupled to the guide slot 98". In the current embodiment, the memory tab 178 is located near the front end 104" of the memory plate 92". The guide bracket 96" includes a recess 180 extending upward at the forward end 100" of the guide slot 98".

Figure 22:
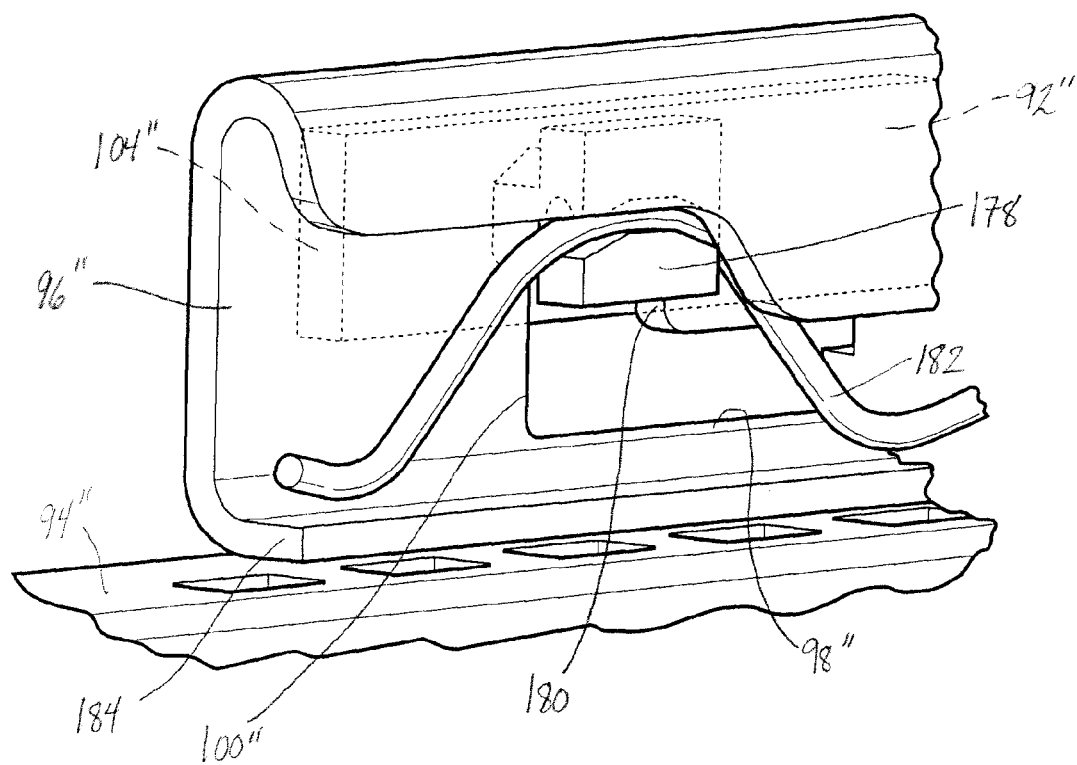
FIG. 22 is a fragmentary, inner perspective view of the guide bracket and the memory plate in the home position.
Figure 23:
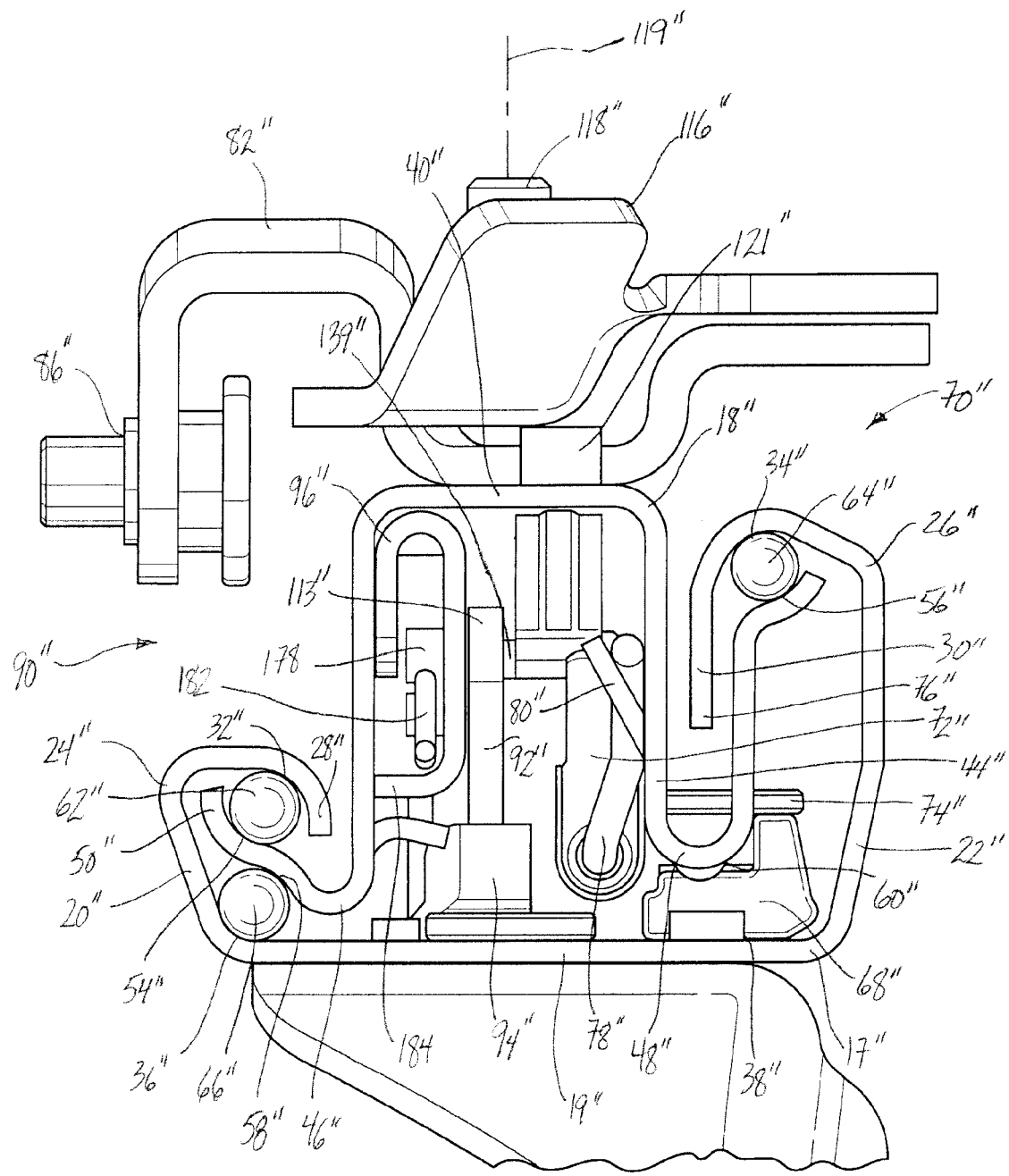
FIG. 23 is a rearward end view of the primary seat track assembly according shown in FIG. 21 illustrating the slider in the depressed position, the latch body in the unlocked position, and the memory plate in the memory position.

The memory plate 92" slides vertically between the home position, shown in FIG. 22, and the memory position, shown in FIG. 24. The memory plate 92" is biased upward toward the home position by a leaf spring 182 acting against a lip 184 extending longitudinally along the length of the guide bracket 96". More specifically, the leaf spring 182 extends longitudinally through the memory tab 178 and opposite ends of the leaf spring 182 engage the lip 184 on the guide bracket 96" to bias the memory tab 178 upward into the recess 180. In the home position, the memory tab 178 is disposed in the recess 180 on the guide bracket 96" and the memory teeth 112" are disengaged from the tooth rack 94" such that the memory plate 92" is coupled with the guide bracket 96" and moves with the movable track 18".

In the memory position, the memory tab 178 is withdrawn from the recess 180 on the guide bracket 96" and the memory teeth 112" are engaged with the tooth rack 94" such that the memory plate 92" is coupled with the tooth rack 94" to identify the previously selected fore/aft seating position. Further, as shown in FIG. 26, when the memory plate 92" is in the memory position the memory tab 178 is trapped in the guide slot 98" during sliding movement of the movable track 18" as the seat assembly 11" moves between the previously selected fore/aft seating position and the easy-entry position. Thus, the memory plate 92" remains in the memory position until the memory tab 178 returns to the recess 180.

Referring to FIG. 25, at least one side of the slider 121" includes a first groove 186 extending downward and rearward at an angle that corresponds with the downward and rearward movement of the slider 121". A second groove 188 extending generally horizontally is interconnected with an upper end of the first groove 186. The guide tab 134" on the movable track 18" cooperates with the first 186 and second 188 grooves to guide the slider 121" from the raised position to the depressed position.

In operation, when access for ingress or egress to the rear seat assembly or storage area is desired, the seat back 13" is actuated to the dumped position. As the seat back 13" pivots forward to the dumped position, the first cable 120" causes the cam lever 116" to pivot in the first direction about pivot 118". As the cam lever 116" pivots in the first direction, the cam lever 116" pushes the slider 121" downward and rearward and the guide tab 134" on the movable track 18" cooperates with the first 186 and second 188 grooves on the slider 121" to guide the slider 121" from the raised position to the depressed position. Movement of the slider 121" from the raised position to the depressed position causes the memory plate 92" to slide vertically from the home position to the memory position, wherein the memory teeth 112" are engaged with the tooth rack 94" to identify the previously selected fore/aft seating position. At the same time, the slider 121" pivots the latch release lever 84" about pivot 86" to actuate the latch body 72" from the locked position to the unlocked position. With the memory plate 92" in the memory position and the latch body 72" in the unlocked position, the movable track 18" is slid forward relative to the fixed track 17" to move the seat assembly 11" from the previously selected fore/aft seating position to the easy-entry position.

To return the seat assembly 11" to the previously selected fore/aft seating position, the movable track 18" is slid rearward relative to the fixed track 17" until the shoulder 139" on the slider 121" contacts the flag tab 113" on the memory plate 92", as shown in FIG. 27, which causes the slider 121" to move forward, thereby withdrawing the step 138" from underneath the upper portion 40" of the movable track 18". The forward end 100" of the guide slot 98" then contacts the memory tab 178, which stops the seat assembly 11" in the previously selected fore/aft seating position. After the seat assembly 11" is stopped in the previously selected fore/aft seating position, continued rearward force applied to the seat back 13" pivots the seat back 13" to the upright position. As the seat back 13" pivots to the upright position, the cam lever 116" pivots in the second direction about pivot 118" and the bias of the leaf spring 78" moves the latch body 72" upward into the locked position. As the latch body 72" moves upward, the arm 88" of the latch release lever 84" moves the slider 121" upward into the raised position. At the same time, the leaf spring 182 pushes against the lip 184 on the guide bracket 96" to move the memory plate 92" upward until the memory tab 178 is disposed in the recess 180 on the guide bracket 96". The memory plate 92" is now in the home position and the movable track 18" is locked relative to the fixed track 17".

The invention has been described herein in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat track assembly providing forward and rearward movement of a seat assembly along a floor in an automotive vehicle, said seat track assembly comprising:
    a fixed track adapted to be fixedly secured to the floor;
    a movable track adapted to be fixedly secured to the seat assembly and slidably coupled to said fixed track;
    a latch mechanism operatively coupled between said fixed and movable tracks, wherein said latch mechanism prevents sliding movement of said movable track and is selectively disengaged from said fixed track to allow sliding movement of said movable track between a plurality of positions; and
    a memory mechanism operable between a home position, wherein said memory mechanism is coupled with said movable track and moves therewith during sliding movement of said movable track, and a memory position, wherein said memory mechanism is coupled with said fixed track and defines a previously selected one of said plurality of positions, wherein said memory mechanism includes a memory plate operatively coupled to said movable track and biased towards said home position, said memory plate is disengaged from said fixed track when said memory mechanism is in said home position and said memory plate is engaged with said fixed track when said memory mechanism is in said memory position;
    wherein actuation of said memory mechanism to said memory position disengages said latch mechanism from said fixed track, thereby allowing sliding movement of said movable track in a first direction away from said previously selected one of said plurality of positions to an easy-entry position, and in response to sliding movement of said movable track in a second direction from said easy-entry position said memory mechanism blocks said movable track at said previously selected one of said plurality of positions, thereby allowing said latch mechanism to engage with said fixed track and said memory mechanism to return to said home position;
    wherein said movable track includes an elongated slot extending between first and second ends, said elongated slot having a recess at said first end and said memory plate having a memory tab extending laterally from a first end of said memory plate, said memory plate is slidably coupled to said elongated slot and said memory tab is disposed in said recess when said memory mechanism is in said home position and said memory tab is withdrawn from said recess when said memory mechanism is in said memory position; wherein said first end of said elongated slot contacts said memory tab to block said movable track at said previously selected one of said plurality of positions in response to sliding movement of said movable track in said second direction and wherein said fixed track includes an elongated tooth rack and said memory plate includes at least one memory tooth, said at least one memory tooth engaged with said tooth rack when said memory mechanism is in said memory position;
    and wherein said latch mechanism is independently operable to disengage said latch mechanism from said fixed track when said memory mechanism is in said home position.

2. The seat track assembly as set forth in claim 1 further including a latch release lever pivotally coupled to said movable track, said latch release lever directly engaging said latch mechanism and operable to disengage said latch mechanism from said fixed track in response to pivotal movement of said latch release lever.

3. The seat track assembly as set forth in claim 2 further including a slider for directly contacting a second end of said memory plate and directly contacting said latch release lever, said slider is operable between a raised position, wherein said memory mechanism is in said home position and said latch mechanism is engaged with said fixed track, and a depressed position, wherein said memory mechanism is in said memory position and said latch mechanism is disengaged from said fixed track.

4. The seat track assembly as set forth in claim 3 wherein said slider includes a groove engaging a guide tab on said movable track, said guide tab guiding said slider between said raised position and said depressed position.

5. The seat track assembly as set forth in claim 3 wherein said movable track contacts said slider in said depressed position to prevent said slider from moving to said raised position during sliding movement of said movable track between said previously selected one of said plurality of positions and said easy-entry position, thereby preventing engagement of said latch mechanism with said fixed track.

6. The seat track assembly as set forth in claim 5 wherein said slider contacts a flag tab on said second end of said memory plate in response to sliding movement of said movable track in said second direction, thereby moving said slider in said first direction to allow said slider to return to said raised position.

7. The seat track assembly as set forth in claim 6 further including a cam lever pivotally coupled to said movable track and directly contacting said slider, wherein pivotal movement of said cam lever in a first direction moves said slider from said raised position to said depressed position.

8. The seat track assembly as set forth in claim 1 wherein said recess extends downward at said first end of said elongated slot and said memory plate pivots between said home position and said memory position.

9. The seat track assembly as set forth in claim 1 wherein said recess extends upward at said first end of said elongated slot and said memory plate slides vertically between said home position and said memory position.

10. The seat track assembly as set forth in claim 3 wherein movement of said slider from said raised position to said depressed position actuates said memory mechanism to said memory position prior to disengaging said latch mechanism from said fixed track.

11. The seat track assembly as set forth in claim 10 wherein movement of said slider from said depressed position to said raised position allows said latch mechanism to engage with said fixed track prior to allowing said memory mechanism to return to said home position.

* * * * *